(12) United States Patent
Yamanashi et al.

(10) Patent No.: US 7,425,021 B2
(45) Date of Patent: Sep. 16, 2008

(54) PIPE JOINT STRUCTURE

(75) Inventors: Satoru Yamanashi, Kariya (JP); Shun Kurata, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/911,775

(22) Filed: Aug. 4, 2004

(65) Prior Publication Data
US 2005/0029806 A1 Feb. 10, 2005

(30) Foreign Application Priority Data

| Aug. 7, 2003 | (JP) | ............... 2003-289110 |
| Aug. 7, 2003 | (JP) | ............... 2003-289111 |
| Aug. 29, 2003 | (JP) | ............... 2003-307285 |

(51) Int. Cl.
*F16L 39/00* (2006.01)
(52) U.S. Cl. .............. 285/124.1; 29/513; 285/382
(58) Field of Classification Search .............. None
See application file for complete search history.

(56) References Cited

U.S. PATENT DOCUMENTS

| 4,314,220 | A | * | 2/1982 | Ito et al. ................... 29/513 |
| 5,774,982 | A | * | 7/1998 | Hutchison et al. ............ 29/513 |
| 6,082,333 | A | * | 7/2000 | Vattelana et al. ............ 285/382 |
| 6,682,100 | B2 | * | 1/2004 | Wood et al. ............. 285/124.3 |
| 2003/0080564 | A1 | * | 5/2003 | Izumi et al. ................ 285/382 |
| 2004/0036277 | A1 | | 2/2004 | Inaba et al. |

OTHER PUBLICATIONS

U.S. Appl. No. 10/610,007, filed Jun. 2003, Inaba et al.

* cited by examiner

*Primary Examiner*—Aaron Dunwoody
(74) *Attorney, Agent, or Firm*—Harness, Dickey & Pierce, PLC

(57) ABSTRACT

A pipe is received through a through hole of a connector. A bulged portion of the pipe is press fitted into a recess of the connector located at a first side of the connector and a retaining member is located at a second side of the connector.

9 Claims, 14 Drawing Sheets

US 7,425,021 B2

PIPE JOINT STRUCTURE

CROSS REFERENCE TO RELATED APPLICATION

This application is based on Japanese Patent Application No. 2003-289110 filed on Aug. 7, 2003, Japanese Patent Application No. 2003-289111 filed on Aug. 7, 2003 and Japanese Patent Application No. 2003-307285 filed on Aug. 29, 2003.

BACKGROUND OF THE INVENTION

1. Field of the Invention

The present invention relates to a pipe joint structure, in which a protrusion of a pipe is press fitted to a connector of the pipe joint structure, and also relates to a manufacturing method of such a pipe joint structure.

2. Description of Related Art

Japanese Unexamined Patent Publication No. 2002-192203 (corresponding to US2004/0036277A1) discloses a pipe joint structure and a manufacturing method thereof. The disclosed pipe joint structure is used, for example, in a refrigerant pipe line arrangement of a refrigeration cycle of a vehicle air conditioning system and includes a connector and two pipes. Two through holes penetrate through the connector in a thickness direction of the connector. An enlarged recess is provided in the connector at one axial end of each through hole. The enlarged recess has a size greater than an inner diameter of the through hole. Each through hole of the connector receives the corresponding pipe in such a manner an annular protrusion formed near an axial end of the pipe is securely press fitted into the enlarged recess.

In the above pipe joint structure, only the annular protrusion of each pipe is securely press fitted into the corresponding enlarged recess of the connector. In such a case, when the pipe joint structure is constructed to have a small space between each pipe and an inner peripheral surface of the corresponding through hole, the pipe could be loosened upon application of an external force to the pipe in some circumstances. The loosening of the pipe could cause removal of the press fitted annular protrusion of the pipe from the enlarged recess. This loosening of the pipe is probably due to the fact that the pipe is secured to the connector only through the connection achieved by the press fitting between the annular protrusion of the pipe and the enlarged recess of the connector. This single point connection between the pipe and the connector may not provide a sufficient connecting strength for connecting between the pipe and the connector in some circumstances.

In a case where an end opening of the end of each refrigerant pipe, which is located near the connector, is connected to an opening of another member by, for example, brazing, relatively small tolerance limits (e.g., about ±0.1) are required in a pith size of the refrigerant pipe at the end opening thereof. However, in the case where the refrigerant pipe is press fitted to the connector, the tolerance is increased (e.g., about ±3.0) in general. Therefore, in some cases, an additional step of adjusting the size of the refrigerant pipe may be performed by, for example, applying a external force, such as a torsional force or a flexural force, to the refrigerant pipe after the press fitting of the refrigerant pipe to the connector, and such an external force could release the press fitted connection between the refrigerant pipe and the connector.

SUMMARY OF THE INVENTION

The present invention addresses the above disadvantage. Thus, it is an objective of the present invention to provide a pipe joint structure, which achieves an increased connecting strength for connecting between a pipe and a connector. It is another objective of the present invention to provide a manufacturing method for manufacturing such a pipe joint structure.

To achieve the objectives of the present invention, there is provided a pipe joint structure, which includes a connector and a pipe. The connector includes a through hole, a recess and at least one holding projection. The through hole penetrates through the connector and has opposed first and second axial ends. The recess is recessed in the connector around the first axial end of the through hole and extends outward from an inner peripheral surface of the through hole in a radial direction of the through hole. The at least one holding projection is provided at the second axial end of the through hole. The pipe is received through the through hole of the connector. The pipe includes a protrusion, which extends along an outer peripheral surface of the pipe and which protrudes radially outward from the outer peripheral surface of the pipe. The protrusion of the pipe is received in the recess of the connector. The at least one holding projection of the connector is bent and is thus urged against the outer peripheral surface of the pipe to hold the pipe.

To achieve the objectives of the present invention, there is also provided a pipe joint structure, which includes a connector, a pipe and a securing member. The connector includes a through hole, a first side recess and a second side recess. The through hole penetrates through the connector and has opposed first and second axial ends. The first side recess is recessed in the connector around the first axial end of the through hole and extends outward from an inner peripheral surface of the through hole in a radial direction of the through hole. The second side recess is recessed in the connector around the second axial end of the through hole and extends outward from the inner peripheral surface of the through hole in the radial direction of the through hole. The pipe is received through the through hole of the connector and includes a protrusion, which extends along an outer peripheral surface of the pipe and protrudes radially outward from the outer peripheral surface of the pipe. The protrusion of the pipe is press fitted into the first side recess of the connector. The securing member is press fitted into the second side recess of the connector to fill a gap between the outer peripheral surface of the pipe and an inner peripheral surface of the second side recess of the connector.

To achieve the objectives of the present invention, there is provided a method for manufacturing a pipe joint structure. According to the method, a through hole is formed through a connector. A recess is formed in the connector around a first axial end of the through hole in such a manner that the recess extends outward from an inner peripheral surface of the through hole in a radial direction of the through hole. At least one holding projection is formed in the connector at a second axial end of the through hole, which is opposite from the first axial end of the through hole. A pipe is formed in such a manner that a protrusion is formed in the pipe to extend along an outer peripheral surface of the pipe and to protrude radially outward from the outer peripheral surface of the pipe. The pipe is inserted into the through hole of the connector in such a manner that the protrusion of the pipe is received in the recess of the connector. The at least one holding projection of the connector is bent against the outer peripheral surface of the pipe to urge the at least one holding projection against the outer peripheral surface of the pipe and thereby to hold the pipe.

To achieve the objectives of the present invention, there is also provided a method for manufacturing a pipe joint structure. According to the method, a through hole is formed through a connector. A first side recess is formed in the connector around a first axial end of the through hole in such a manner that the first side recess extends outward from an inner peripheral surface of the through hole in a radial direction of the through hole. A second side recess is formed in the connector around a second axial end of the through hole, which is opposite from the first axial end of the through hole, in such a manner that the second side recess extends outward from the inner peripheral surface of the through hole in the radial direction of the through hole. A pipe, which has a protrusion, is inserted into the through hole of the connector, and the protrusion of the pipe is press fitted into the first side recess of the connector. A securing member is press fitted into the second side recess of the connector in such a manner that the securing member fills a gap between an outer peripheral surface of the pipe and an inner peripheral surface of the second side recess of the connector.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
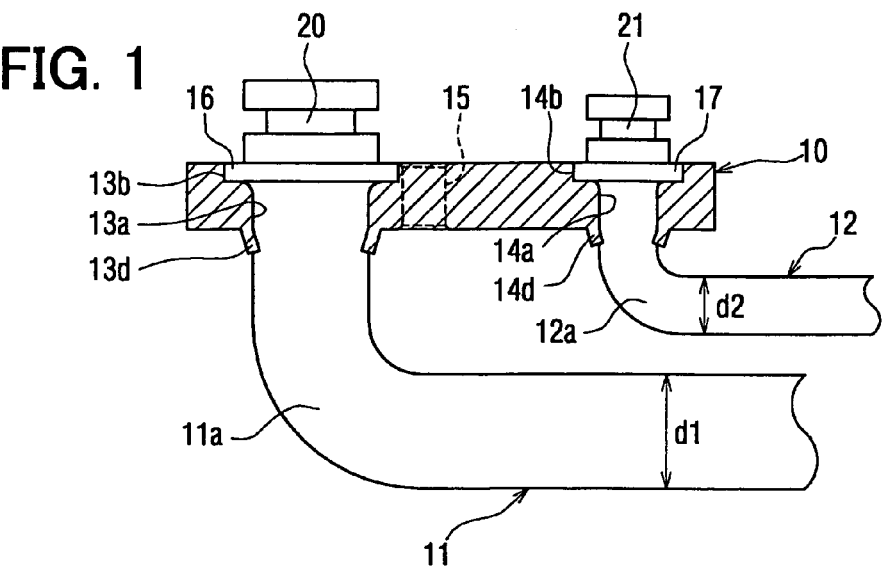
FIG. 1 is a schematic view showing a structure of a pipe joint structure according to a first embodiment of the present invention.

A pipe joint structure and a manufacturing method thereof according to a first embodiment of the present invention will be described with reference to FIGS. 1 to 6B. The present invention is embodied in a refrigerant pipe line arrangement of a refrigeration cycle of a vehicle air conditioning system. FIG. 1 schematically shows the pipe joint structure of the refrigerant pipe line arrangement. As shown in FIG. 1, a connector 10 is formed into a rectangular plate shape and securely holds two refrigerant pipes (large and small refrigerant pipes) 11, 12, as shown in FIGS. 2A to 3.

The refrigerant pipe 11 has a relatively large outer diameter d1 and serves as a low pressure side refrigerant pipe of the refrigeration cycle. More specifically, the refrigerant pipe 11 is a compressor intake side refrigerant pipe. The refrigerant pipe 12 has a relatively small outer diameter d2 in comparison to the outer diameter d1 of the refrigerant pipe 11 and serves as a high pressure side refrigerant pipe of the refrigeration cycle. More specifically, the refrigerant pipe 12 is a high pressure side refrigerant pipe, which is located on an expansion valve inlet side.

A distal end of the low pressure side refrigerant pipe (the compressor intake side refrigerant pipe) 11 is connected to a low pressure side refrigerant outlet of an expansion valve (not shown), which serves a depressurizing means. A distal end of the high pressure side refrigerant pipe 12 is connected to a high pressure side refrigerant inlet of the expansion valve. Thus, in the first embodiment, a mating member, which mates with the refrigerant pipes 11, 12, is the expansion valve.

Figure 2A:
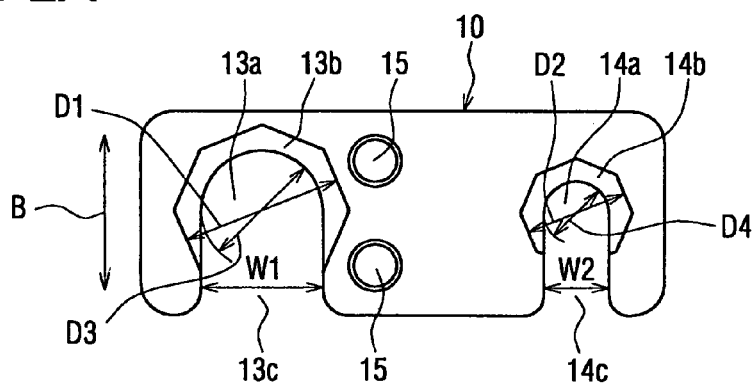
FIG. 2A is a plan view of a connector of the pipe joint structure according to the first embodiment of the present invention.
Figure 3:
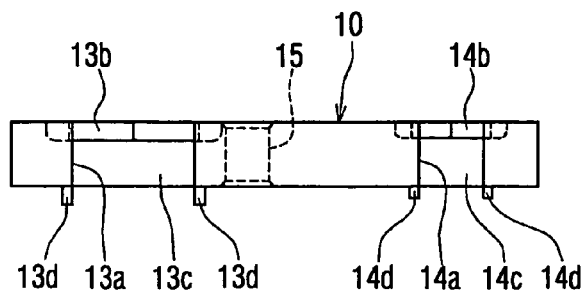
FIG. 3 is a front view of the connector shown in FIGS. 2A and 2B.
Figure 4A:
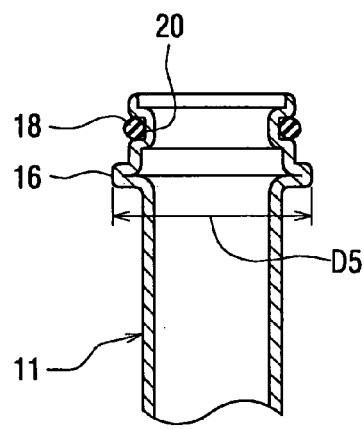
FIG. 4A is a partial longitudinal cross sectional view of a large refrigerant pipe, which has a large diameter, of the pipe joint structure shown in FIG. 1.
Figure 4B:
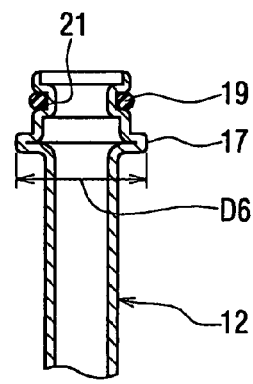
FIG. 4B is a partial longitudinal cross sectional view of a small refrigerant pipe, which has a small diameter, of the pipe joint structure shown in FIG. 1.

As shown in FIG. 2A, two through holes 13*a*, 14*a* penetrate through the connector 10 in a thickness direction of the connector 10, which is defined as a direction perpendicular to a plane of the connector 10. The through holes 13*a*, 14*a* are for receiving the refrigerant pipes 11, 12, respectively. The through hole 13*a* is located on one longitudinal end side of the connector 10, and the through hole 14*a* is located on the other longitudinal end side of the connector 10.

Two bolt receiving holes 15 penetrate through the connector 10 in the thickness direction of the connector 10 at an intermediate longitudinal location between the through hole 13*a* and the through hole 14*a*. The connector 10 is secured to a housing (not shown) of the expansion valve by bolts (not shown), which are inserted through the bolt receiving holes 15, respectively, and are threadably engaged with the housing of the expansion valve.

The through holes 13*a*, 14*a* have different diameters to correspond with the refrigerant pipes 11, 12, respectively, and have a U-shaped cross section. More specifically, each through hole 13*a*, 14*a* opens radially outward to an exterior of the connector 10 through a corresponding radial opening 13*c*, 14*c*, which extends along an entire axial extent of the through hole 13*a*, 14*a*. An opening direction of each radial opening 13*c*, 14*c* is parallel to a transverse direction B of the connector 10, which is perpendicular to the longitudinal direction of the connector 10.

An enlarged recess 13*b*, 14*b*, which has a polygonal cross section (e.g., an octagonal cross section), is formed in one axial end (a first axial end) of each through hole 13*a*, 14*a* in direct communication with the through hole 13*a*, 14*a*. A diameter D1, D2 of each imaginary inscribed circle, which inscribes the corresponding enlarged recess 13*b*, 14*b*, is larger than an inner diameter D3, D4 of the corresponding through hole 13*a*, 14*a* by a predetermined amount. Furthermore, the inner diameter D3 of the through hole 13*a* is larger than the outer diameter d1 of the refrigerant pipe 11 by a predetermined amount. Also, the inner diameter D4 of the through hole 14*a* is larger than the outer diameter d2 of the refrigerant pipe 12 by a predetermined amount. A width (i.e., a size measured in the longitudinal direction of the connector 10) W1, W2 of each radial opening 13*c*, 14*c* is generally the same as the inner diameter D3, D4 of the corresponding through hole 13*a*, 14*a*.

Figure 2B:
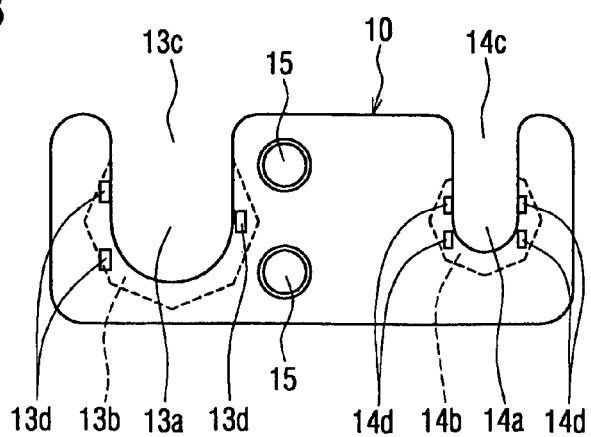
FIG. 2B is a bottom view of the connector shown in FIG. 2A.

As shown in FIGS. 2B and 3, a plurality (e.g. three or four) of holding projections 13*d*, 14*d* is provided at a peripheral edge of the other axial end (a second axial end) of each through hole 13*a*, 14*a* to extend generally in the axial direction of the through hole 13*a*, 14*a*.

The holding projections 13*d*, 14*d* are formed as ribs, each of which extends generally in an axial direction of the through hole 13*a*, 14*a* and is bent inward in a radial direction of the corresponding through hole 13*a*, 14*a* against an outer peripheral surface of the pipe 11, 12 to securely hold it. Thus, upon the bending, each holding projection 13*d*, 14*d* is angled relative to the axial direction of the corresponding through hole 13*a*, 14*a*. In the first embodiment, the three or four holding projections 13*d*, 14*d* are provided to each through hole 13*a*, 14*a*. However, the number of the holding projections 13*d*, 14*d* is not limited to this. It is only required to provide at least three holding projections 13*d*, 14*d* to each through hole 13*a*, 14*a* in this particular instance.

The connector 10 is made of metal. In the first embodiment, the connector 10 is made of an aluminum material. In order to minimize the manufacturing costs, the connector 10 is formed integrally into a shape shown in FIGS. 2A to 3 through a die-casting process. Alternatively, the connector 10 can be formed through a cutting process. However, the manufacturing of the connector 10 through the cutting process disadvantageously causes an increase in the manufacturing costs.

Next, the refrigerant pipes 11, 12 will be described in details. While the refrigerant pipes 11, 12 differ in diameter, they have generally the same shape. The refrigerant pipes 11, 12 are made of metal. In the first embodiment, the refrigerant pipes 11, 12 are made of an aluminum material. More specifically, the aluminum material of the refrigerant pipes 11, 12 can be the aluminum alloy A3003-O, which has a relatively low hardness among various aluminum alloys and thereby allows easy formation of the shape of the pipe 11, 12.

The aluminum material of the connector 10 is an aluminum alloy, which has a higher mechanical strength and a higher hardness in comparison to the aluminum alloy A3003-O to allow press fitting of the refrigerant pipes 11, 12 to the connector 10. A bulged portion (a protrusion) 16, 17 is formed integrally in each refrigerant pipe 11, 12 near a distal end of the refrigerant pipe 11, 12 through a known bulging process. The bulged portion 16, 17 has an annular shape and protrudes radially outward. An outer diameter D5, D6 of each bulged portion 16, 17 is larger than the diameter of the inscribed circle of the corresponding polygonal enlarged recess 13*b*, 14*b* of the connector 10 by a predetermined amount.

A recessed annular groove 20, 21, which has an annular shape for receiving an O-ring 18, 19 (FIGS. 4A and 4B), is formed through a spinning process on a distal end side of the bulged portion 16, 17 in each refrigerant pipe 11, 12. In the first embodiment, each refrigerant pipe 11, 12 has a bend (i.e. a curved portion) 11*a*, 12*a*, which is preformed in the refrigerant pipe 11, 12 before installation of the refrigerant pipe 11, 12 to the connector 10. The refrigerant pipes 11, 12, each of which has the bend 11*a*, 12*a*, are press fitted into the connector 10.

Next, assembly of the pipe joint structure, which has the above structure, will be described. The connector 10 is previously formed into the shape shown in FIGS. 2A to 3 through the die-casting process before the assembly. Furthermore, each refrigerant pipe 11, 12 is also previously formed into the shape shown in FIG. 4A or 4B. More specifically, each refrigerant pipe 11, 12 is previously formed to have the annular bulged portion 16, 17, the recessed annular groove 20, 21 and the bend 11*a*, 12*a*.

Figure 5:
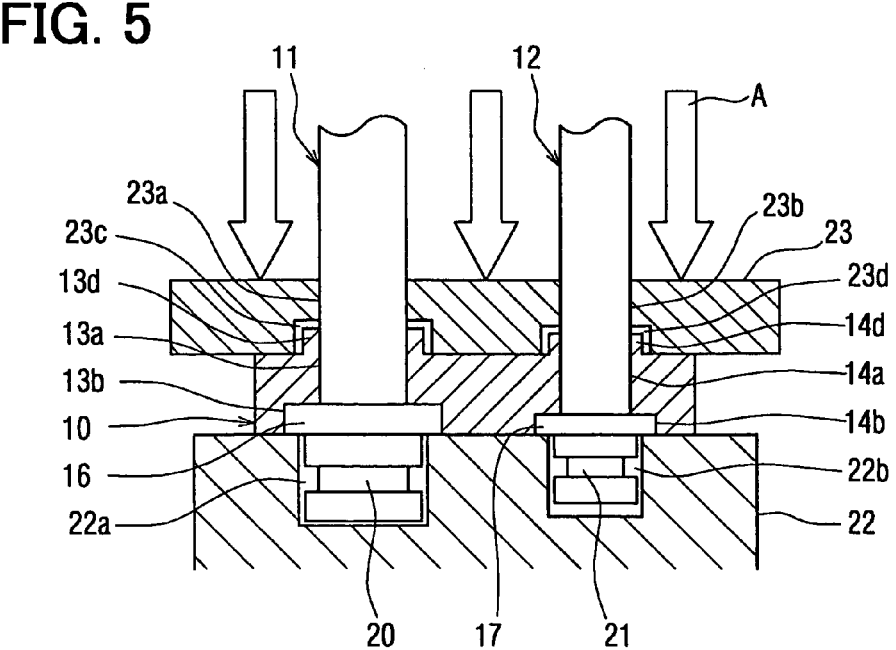
FIG. 5 is a schematic cross sectional view showing one stage of an assembling process of the pipe joint structure according to the first embodiment.
Figure 6A:
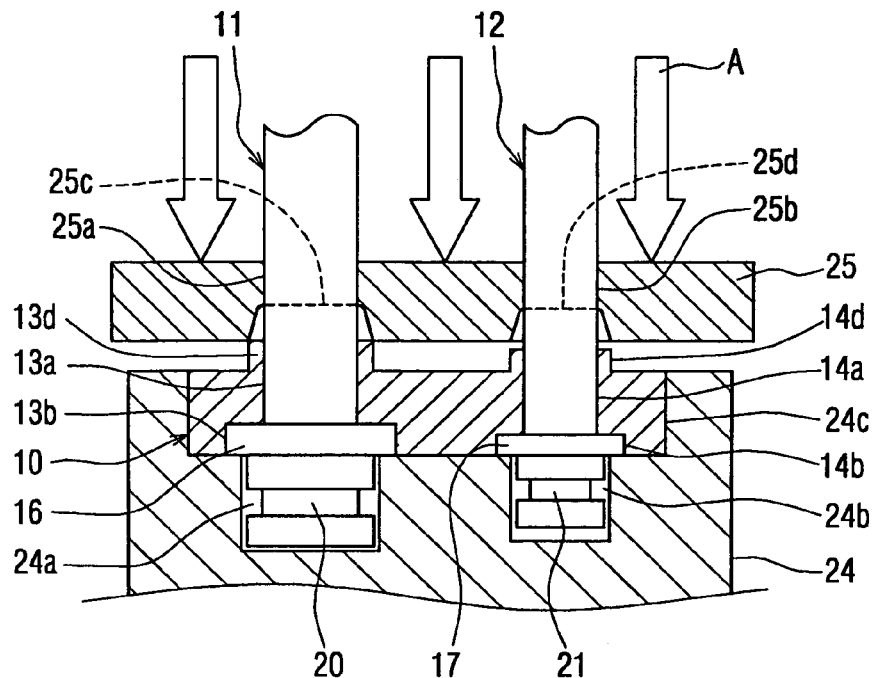
FIG. 6A is a schematic cross sectional view showing another stage of an assembling process of the pipe joint structure according to the first embodiment.
Figure 6B:
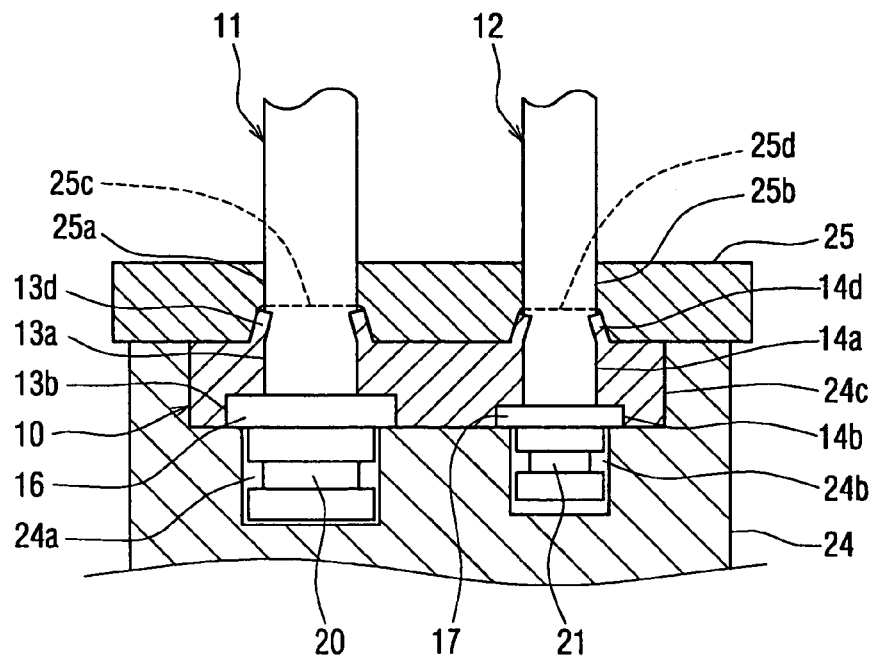
FIG. 6B is a schematic cross sectional view showing another stage of an assembling process of the pipe joint structure according to the first embodiment.

FIG. 5 shows a press fitting apparatus for press fitting the refrigerant pipes 11, 12 to the connector 10. FIGS. 6A and 6B show a bending/urging apparatus for bending and urging the holding projections 13*d*, 14*d* of the connector 10 against the outer peripheral surface of the corresponding refrigerant pipe 11, 12 to securely hold the refrigerant pipe 11, 12 by the connector 10. The press fitting apparatus of FIG. 5 used in the press fitting process for press fitting the pipes 11, 12 into the connector 10 includes a stationary jig 22 and a movable jig 23.

The movable jig 23 is arranged above the stationary jig 22 and is vertically movable relative to the stationary jig 22.

The stationary jig 22 has two pipe end receiving recesses 22a, 22b. Each pipe end receiving recess 22a, 22b receives the distal end section of the corresponding refrigerant pipe 11, 12, which includes the recessed annular groove 20, 21. The movable jig 23 includes two through holes 23a, 23b and two projection receiving recesses 23c, 23d. Each through hole 23a, 23b of the movable jig 23 receives a linear portion of the corresponding refrigerant pipe 11, 12. Each projection receiving recess 23c, 23d of the movable jig 23 is formed continuously with the corresponding through hole 23a, 23b and receives the corresponding holding projections 13d, 14d of the connector 10.

The distal end section of each refrigerant pipe 11,.12, which includes the recessed annular groove 20, 21, is received in the corresponding pipe end receiving recess 22a, 22b of the stationary jig 22 in such a manner that an end surface of the annular bulged portion 16, 17 abuts against a top end surface of the stationary jig 22. In this state, each refrigerant pipe 11, 12 is received through the corresponding through hole 13a, 14a of the connector 10 and the corresponding through hole 23a, 23b of the movable jig 23. Also, in this state, the holding projections 13d, 14d do not contact the movable jig 23.

Next, a press force is applied from a press apparatus (not shown) to the movable jig 23 in a direction of arrow A in FIG. 5 to depress the movable jig 23 and the connector 10. At this time, since the outer diameter D5, D6 of the bulged portion 16, 17 of each refrigerant pipe 11, 12 is larger than the diameter D1, D2 of the inscribed circle of the corresponding polygonal enlarged recess 13b, 14b by the predetermined amount, an outer peripheral surface of the bulged portion 16, 17 is deformed to conform with the polygonal shape of the enlarged recess 13b, 14b. That is, the connector 10 moves downward and, at the same time, deforms the outer peripheral surface of the bulged portion 16, 17 of each refrigerant pipe 11, 12.

In this way, the outer peripheral surface of the bulged portion 16, 17 of each refrigerant pipe 11, 12 tightly contacts a polygonal inner wall surface of the corresponding enlarged recess 13b, 14b of the connector 10. Upon deformation of the outer peripheral surface of the bulged portion 16, 17, a restoring force (a reaction force) for restoring the deformed shape to its original shape is generated in the bulged portion 16, 17. Thus, due to the restoring force, the outer peripheral surface of the bulged portion 16, 17 is strongly urged against the polygonal inner wall surface of the corresponding enlarged recess 13b, 14b. As a result, each refrigerant pipe 11, 12 is securely press fitted to the connector 10 through its bulged portion 16, 17.

A difference between the outer diameter D5, D6 of each bulged portion 16, 17 and the diameter D1, D2 of the inscribed circle of the corresponding polygonal enlarged recess 13b, 14b is in a range of 0.2-1.2 mm. FIG. 5 shows a state where an end surface of the connector 10, which is located on the enlarged recess 13b, 14b side of the connector 10, abuts against the top end surface of the stationary jig 22, and thereby the downward movement of the connector 10 ends. In other words, FIG. 5 shows the end of the press fitting process of the refrigerant pipes 11, 12 to the connector 10.

Next, at the time of bending and urging the holding projections 13d, 14d against the refrigerant pipes 11, 12 after the press fitting of the refrigerant pipes 11, 12 to the connector 10, the bending/urging apparatus is used. As shown in FIGS. 6A and 6B, the bending/urging apparatus includes a stationary jig 24 and a movable jig 25. The movable jig 25 is positioned above the stationary jig 24 and is movable in the vertical direction relative to the stationary jig 24.

The stationary jig 24 includes two pipe end receiving recesses 24a, 24b and a connector receiving recess 24c. Each pipe end receiving recess 24a, 24b receives the distal end section of the corresponding refrigerant pipe 11, 12, which includes the recessed annular groove 20, 21. The connector receiving recess 24c receives the connector 10. The movable jig 25 includes two through holes 25a, 25b and two tapered recesses 25c, 25d. Each through hole 25a, 25b of the movable jig 25 receives the linear portion of the corresponding refrigerant pipe 11, 12. Each tapered recess 25c, 25d is tapered in a direction away from the stationary jig 24 and receives the corresponding holding projections 13d, 14d of the connector 10 to bend and to urge the corresponding holding projections 13d, 14d against the outer peripheral surface of the corresponding refrigerant pipe 11, 12.

The distal end sections of the refrigerant pipes 11, 12, each of which includes the corresponding recessed annular groove 20, 21, are received in the pipe end receiving recesses 24a, 24b, respectively, of the stationary jig 24, and the connector 10 is received in the connector receiving recess 24c of the stationary jig 24. In this state, each refrigerant pipe 11, 12 is received through the corresponding through hole 25a, 25b of the movable jig 25.

Next, a press force is applied from a press apparatus (not shown) to the movable jig 25 in a direction of arrow A in FIG. 6A to depress the movable jig 25. At this time, the tapered recesses 25c, 25d of the movable jig 25 move downwardly, so that each holding projection 13d, 14d is bent toward the outer peripheral surface of the corresponding refrigerant pipe 11, 12 in conformity with the taper of the corresponding tapered recess 25c, 25d. Therefore, the holding projections 13d, 14d are bent and are urged against the outer peripheral surface of the corresponding refrigerant pipe 11, 12 to securely hold it.

A degree of bite of the holding projections 13d, 14d against the refrigerant pipe 11, 12 can be adjusted by adjusting a taper angle of the corresponding tapered recess 25c, 25d. Through this adjustment, a holding force of the holding projections 13, 14 for holding the refrigerant pipe 11, 12 can be adjusted. FIG. 6A shows one stage of the assembling process where a lower end of the tapered recess 25c of the movable jig 25 overlaps with distal ends of the holding projections 13d in the axial direction. FIG. 6B shows another stage where the movable jig 25 contacts the top end surface of the stationary jig 24, and thereby the downward movement of the movable jig 25 ends.

Through the two steps described above, each refrigerant pipe 11, 12 is securely connected to the connector 10 at two locations, i.e., the location where the bulged portion 16, 17 of the refrigerant pipe 11, 12 is press fitted into the corresponding enlarged recess 13b, 14b of the connector 10 and the location where the holding projections 13d, 14d are bent and are urged against the outer peripheral surface of the refrigerant pipe 11, 12. Thus, the connecting strength for connecting between the connector 10 and the refrigerant pipes 11, 12 is increased. In the first embodiment, the step of bending and urging the holding projections 13d, 14d against the outer peripheral surface of the refrigerant pipe 11, 12 is performed after the step of the press fitting the refrigerant pipes 11, 12 into the connector 10. However, these steps can be performed simultaneously. This can be accomplished simply by using the stationary jig 24 and the movable jig 25 or simply by modifying the projection receiving recesses 23c, 23d of the movable jig 23 to bend and urge the holding projections 13d, 14d against the outer peripheral surface of the pipe 11, 12. In this way, the manufacturing costs can be reduced.

However, in this case, it has been found through an experiment that when the movable jig 23 and the connector 10 move downward, axially scratched grooves are formed in the outer peripheral surface of each refrigerant pipe 11, 12 by the holding projections 13d, 14d. The axially scratched grooves could cause loose axial movement of the refrigerant pipe 11, 12 within an axial extent of the scratched grooves upon application of an external force to the refrigerant pipe 11, 12, and such loose axial movement of the refrigerant pipe 11, 12 could cause axial removal of the press fitted portion of the refrigerant pipe 11, 12 from the connector 10. However, engagement between the refrigerant pipe 11, 12 and the holding projections 13d, 14d will not be released by such loose axial movement of the refrigerant pipe 11, 12.

The pipe joint structure and the manufacturing method thereof according to the first embodiment provide the following advantages. That is, each refrigerant pipe 11, 12 is securely connected to the connector 10 at two locations, i.e., the location where the bulged portion 16, 17 of the refrigerant pipe 11, 12 is press fitted into the corresponding enlarged recess 13b, 14b of the connector 10 and the location where the holding projections 13d, 14d are bent and are urged against the outer peripheral surface of the refrigerant pipe 11, 12. Thus, the connecting strength for connecting between the connector 10 and the refrigerant pipes 11, 12 is increased. Therefore, removal of the refrigerant pipes 11, 12 from the connector 10 upon application of the external force is effectively limited.

Furthermore, the multiple holding projections 13d, 14d are arranged one after the other in the circumferential direction of the through hole 13a, 14a. With this arrangement, the multiple holding projections 13d, 14d can be formed integrally in the other axial end of the connector 10 together with the through holes 13a, 14a and the enlarged recesses 13b, 14b. Thus, the connector 10 can be effectively integrally formed by, for example, the die-casting process. In this way, the manufacturing costs of the pipe joint structure can be minimized.

At the step of press fitting the refrigerant pipes 11, 12 into the connector 10, the outer peripheral surface of each bulged portion 16, 17 is deformed to conform with the polygonal inner wall surface of the corresponding enlarged recess 13b, 14b. Thus, each bulged portion 16, 17 can be reliably held by the corresponding enlarged recess 13b, 14b. Furthermore, the polygonal shape of each enlarged recess 13b, 14b allows more effective limitation of rotation of the refrigerant pipe 11, 12 relative to the connector 10.

Each refrigerant pipe 11, 12 is made of the aluminum alloy, and the connector 10 is made of the aluminum alloy, which has the hardness greater than that of the aluminum alloy of the refrigerant pipe 11, 12. Through use of the aluminum alloy, which has the relatively low hardness, the formability of each refrigerant pipe 11, 12 is improved. Furthermore, the deformation of each bulged portion 16, 17 at the time of press fitting the refrigerant pipe 11, 12 into the connector 10 can be performed smoothly. In addition, since the connector 10 is made of the aluminum alloy, which has the relatively high hardness, the required strength of the connector 10 can be easily achieved. Also, each bulged portion 16, 17, which is press fitted into the corresponding enlarged recess 13b, 14b and is thus deformed, can be effectively and securely held by the enlarged recess 13b, 14b. Furthermore, the holding projections 13d, 14d can be effectively held by the corresponding refrigerant pipe 11, 12.

The connector 10 is constructed to hold the multiple refrigerant pipes 11, 12. Thus, at least a feed pipe and a return pipe of the refrigerant pipe arrangement of the refrigeration cycle can be integrally held by the connector 10. Therefore, the connector 10 is suitable for the refrigerant pipe joint of the refrigeration cycle of the vehicle air conditioning system.

Each through hole 13a, 14a and the corresponding enlarged recess 13b, 14b have the common corresponding radial opening 13c, 14c, which opens directly to the exterior of the connector 10 in the radial direction of the through hole 13a, 14a. Thus, the bend 11a, 12a can be preformed near the bulged portion 16, 17 in the refrigerant pipe 11, 12, and the refrigerant pipe 11, 12, which has the bend 11a, 12a, can be inserted into the through hole 13a, 14a and the enlarged recess 13b, 14b through the radial opening 13c, 14c. Therefore, the bend 11a, 12a can be preformed near the bulged portion 16, 17 in the refrigerant pipe 11, 12 before installation of the refrigerant pipe 11, 12 into the connector 10. In this way, the height of the joint can be further reduced.

When the step of bending the holding projections 13d, 14d against the outer peripheral surface of the refrigerant pipe 11, 12 to urge the holding projections 13d, 14d against the outer peripheral surface of the refrigerant pipe 11, 12 and thereby to hold the refrigerant pipe 11, 12 is performed simultaneously with the step of securely press fitting the bulged portion 16, 17 into the enlarged recess 13b, 14b, it is possible to use a preexisting machine having a movable jig (e.g., a punch die), such as one recited in US2004/0036277A1, by modifying the movable jig to bend and urge the holding projections 13d, 14d against the outer peripheral surface of the refrigerant pipe 11, 12. In this way, the manufacturing costs can be minimized.

When the step of bending the holding projections 13d, 14d against the outer peripheral surface of the refrigerant pipe 11, 12 to urge the holding projections 13d, 14d against the outer peripheral surface of the refrigerant pipe 11, 12 and thereby to hold the refrigerant pipe 11, 12 is performed simultaneously with the step of securely press fitting the bulged portion 16, 17 into the enlarged recess 13b, 14b, axially scratched grooves may be formed in the outer peripheral surface of the refrigerant pipe 11, 12 by the holding projections 13d, 14d in the axial direction of the refrigerant pipe 11, 12. The axially scratched grooves could cause the loose axial movement of the refrigerant pipe 11, 12.

When the step of bending the holding projections 13d, 14d against the outer peripheral surface of the refrigerant pipe 11, 12 to urge the holding projections 13d, 14d against the outer peripheral surface of the refrigerant pipe 11, 12 and thereby to hold the refrigerant pipe 11, 12 is performed after the step of securely press fitting the bulged portion 16, 17 into the enlarged recess 13b, 14b, the holding projections 13d, 14d can be bent and can be urged against the outer peripheral surface of the refrigerant pipe 11, 12 to hold the refrigerant pipe 11, 12 without forming the scratched grooves on the refrigerant pipe 11, 12. As a result, it is possible to eliminate the loose axial movement of the refrigerant pipe 11, 12, and the connecting strength for connecting between the connector 10 and the refrigerant pipes 11, 12 can be increased.

Second Embodiment

Figure 7A:
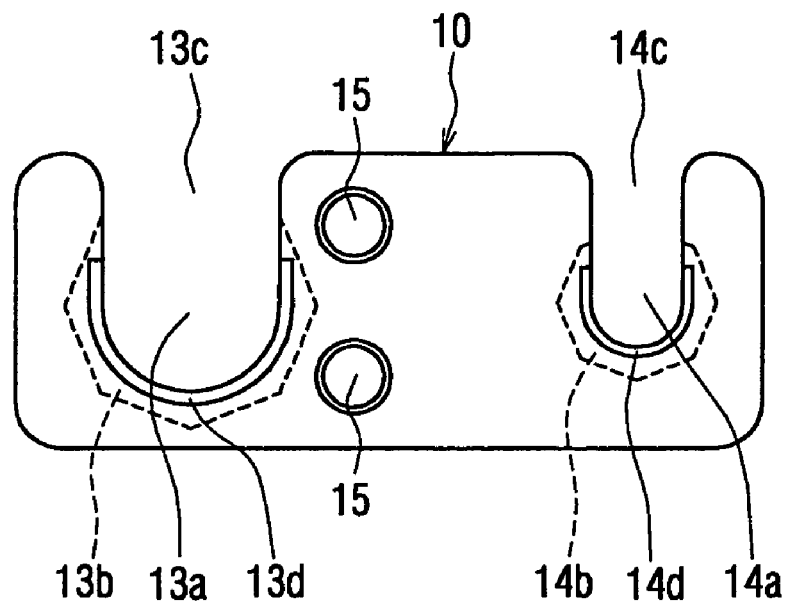
FIG. 7A is a bottom view of a connector according to a second embodiment of the present invention.
Figure 7B:
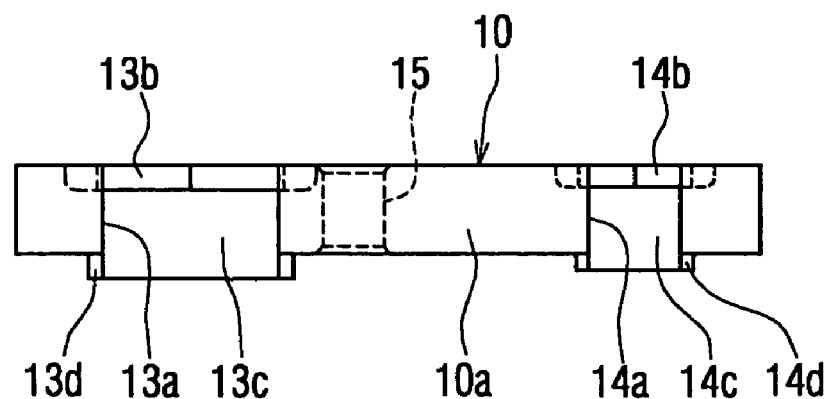
FIG. 7B is a front view of the connector of FIG. 7A.

In the first embodiment, the multiple holding projections (three to four holding projections) 13d, 14d, which extend generally in the axial direction of the corresponding through hole 13a, 14a, are formed at the peripheral edge of the other end of the through hole 13a, 14a. However, the present invention is not limited to this. In a second embodiment, as shown in FIGS. 7A and 7B, in place of the multiple holding projections 13d, 14d of the first embodiment, a generally U-shaped holding projection 13d, 14d is formed at the peripheral edge of the other end of each through hole 13a, 14a.

In this way, a circumferential extent of the holding projection 13d, 14d is increased along the outer peripheral surface of the corresponding refrigerant pipe 11, 12, so that the holding force can be generally uniformly applied to the outer peripheral surface of the refrigerant pipe 11, 12. Furthermore, it is possible to achieve generally uniform bite of the holding projection 13d, 14d against the refrigerant pipe 11, 12 along the circumferential extent of the holding projection 13d, 14d. With respect to FIGS. 7A and 7B, it should be noted that the components, which are the same as those of the first embodiment, are indicated by the similar numerals and will not be described further for the sake of simplicity. Furthermore, besides the generally U-shape, the holding projection 13d, 14d can have a generally semicircular shape.

Figure 8A:
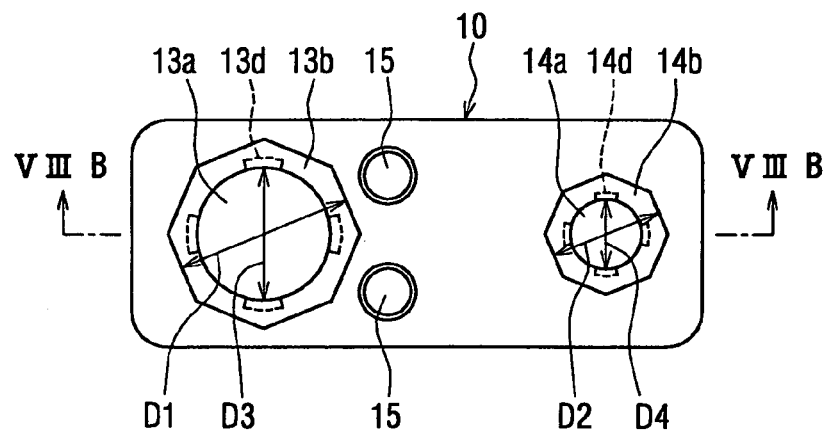
FIG. 8A is a plan view showing a modification of the connector of the first embodiment.
Figure 8B:
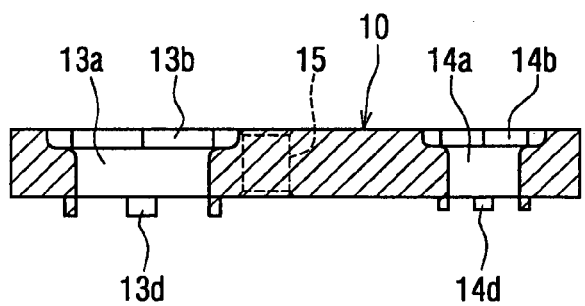
FIG. 8B is a cross sectional view taken along line VIIIB-VIIIB in FIG. 8A.

In the first and second embodiments, each through hole 13a, 14a has the corresponding radial opening 13c, 14c, which opens directly to the exterior of the connector 10 in the radial direction of the through hole 13a, 14a. Alternatively, the radial opening 13c, 14c can be eliminated from the through hole 13a, 14a, as indicated in FIGS. 8A and 8B.

In this case, four holding projections 13d, 14d are arranged in the circumferential direction of the through hole 13a, 14a in such a manner that each holding projection 13d, 14d is diametrically opposed to another one of the holding projections 13d, 14d. In this way, the holding force can be uniformly applied to the outer peripheral surface of the refrigerant pipe 11, 12 from the holding projections 13d, 14d. In addition, uniform bite of the holding projections 13d, 14d against the outer peripheral surface of the refrigerant pipe 11, 12 can be achieved.

Figure 9:
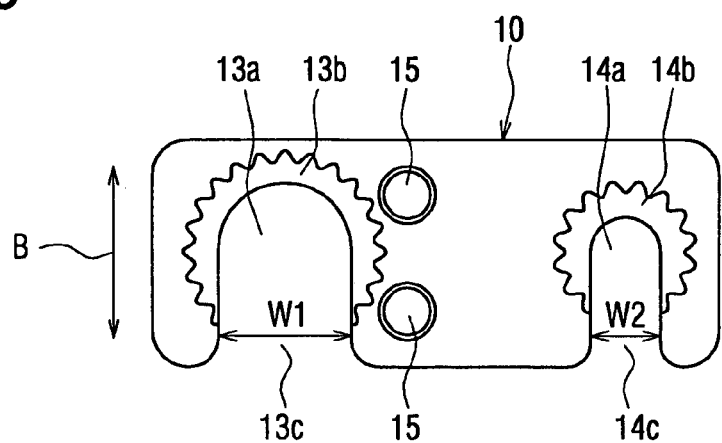
FIG. 9 is a plan view showing another modification of the connector of the first embodiment.

In the first and second embodiments, each enlarged recess 13b, 14b has the polygonal cross section (e.g., the octagonal cross section). The polygonal cross section of each enlarged recess 13d, 14b is not required to be the octagonal cross section. More specifically, the polygonal cross section can be one, which has a plurality of radially close sections and a plurality of radially remote sections. Each radially close section is radially closer to the inner peripheral surface of the through hole 13a, 14a in comparison to the radially remote sections. The radially close sections and the radially remote sections are alternately arranged in the circumferential direction of the through hole 13a, 14a. Therefore, as shown in FIG. 9, the cross section of each enlarged recess 13b, 14b can have a serrated shape, which resembles a toothed edge of a saw.

Third Embodiment

A pipe joint structure and a manufacturing method thereof according to a third embodiment of the present invention will be described with reference to FIGS. 10A to 13. The present invention is embodied in a refrigerant pipe line arrangement of a refrigeration cycle of a vehicle air conditioning system.

Figure 10A:
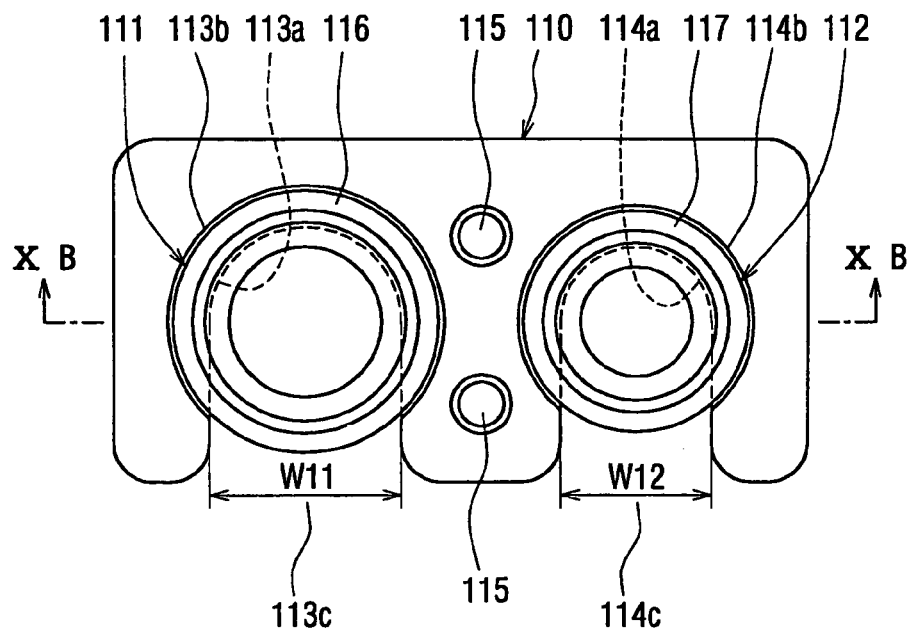
FIG. 10A is a schematic plan view showing a pipe joint structure according to a third embodiment of the present invention.
Figure 10B:
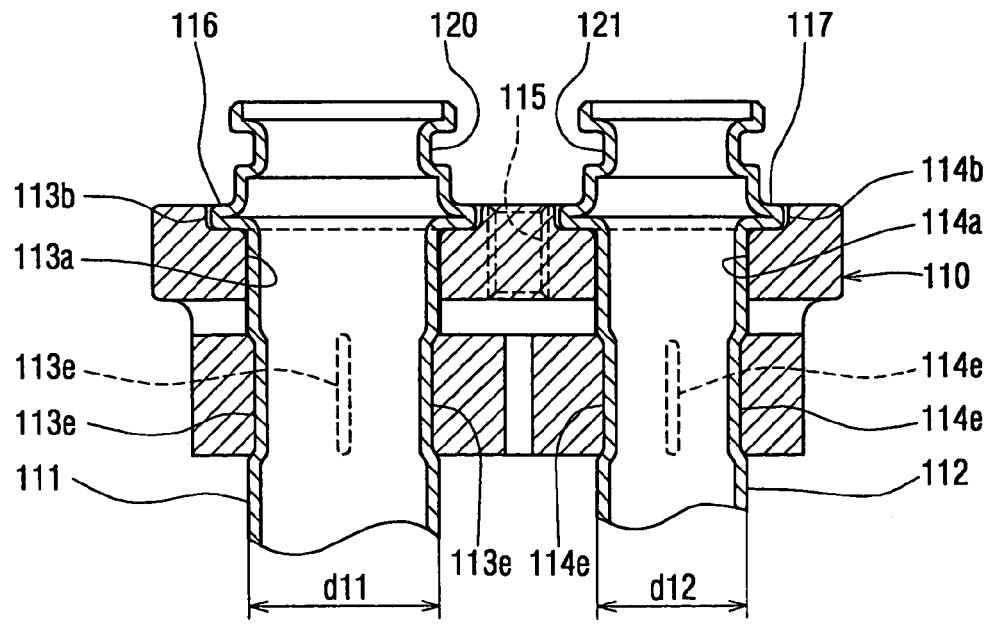
FIG. 10B is a cross sectional view taken along line XB-XB in FIG. 10A.
Figure 11:
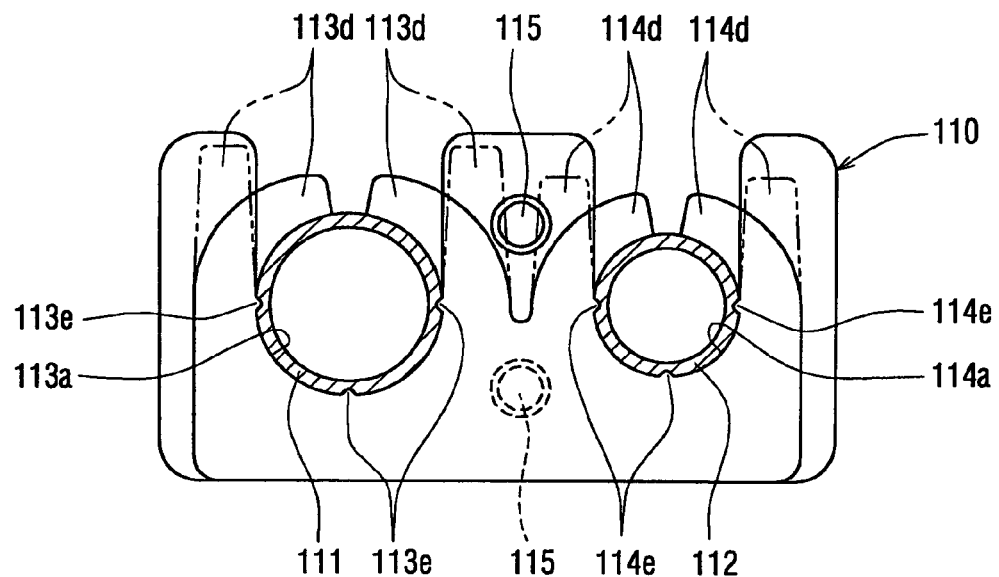
FIG. 11 is a bottom view of the pipe joint structure according to the third embodiment of the present invention.

With reference to FIGS. 10A to 11, a connector 110 securely holds two refrigerant pipes 111, 112. The connector 110 is formed into a generally rectangular plate shape, as shown in FIGS. 10A to 12B. The refrigerant pipe 111 has a relatively large outer diameter d11 (e.g., D⅝ inches) and serves as a low pressure side refrigerant pipe of the refrigeration cycle. More specifically, the refrigerant pipe 111 is an evaporator outlet side refrigerant pipe.

The refrigerant pipe 112 has a relatively small outer diameter d12 (e.g., D½ inches) in comparison to the outer diameter d11 of the refrigerant pipe 111 and serves as a low pressure side refrigerant pipe located on a downstream side of a depressurizing means of the refrigeration cycle. More specifically, the refrigerant pipe 112 is an evaporator inlet side refrigerant pipe. A distal end of the low pressure side refrigerant pipe 111 is connected to an outlet of an evaporator (not shown), and a distal end of the low pressure side refrigerant pipe 112 is connected to an inlet of the evaporator.

Figure 12A:
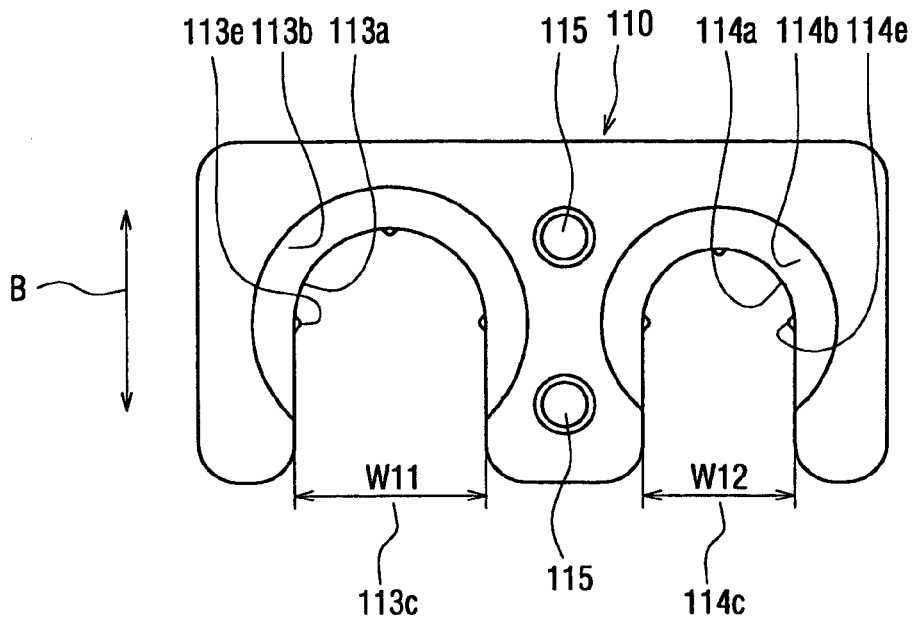
FIG. 12A is plan view of a connector of the pipe joint structure of the third embodiment.
Figure 12B:
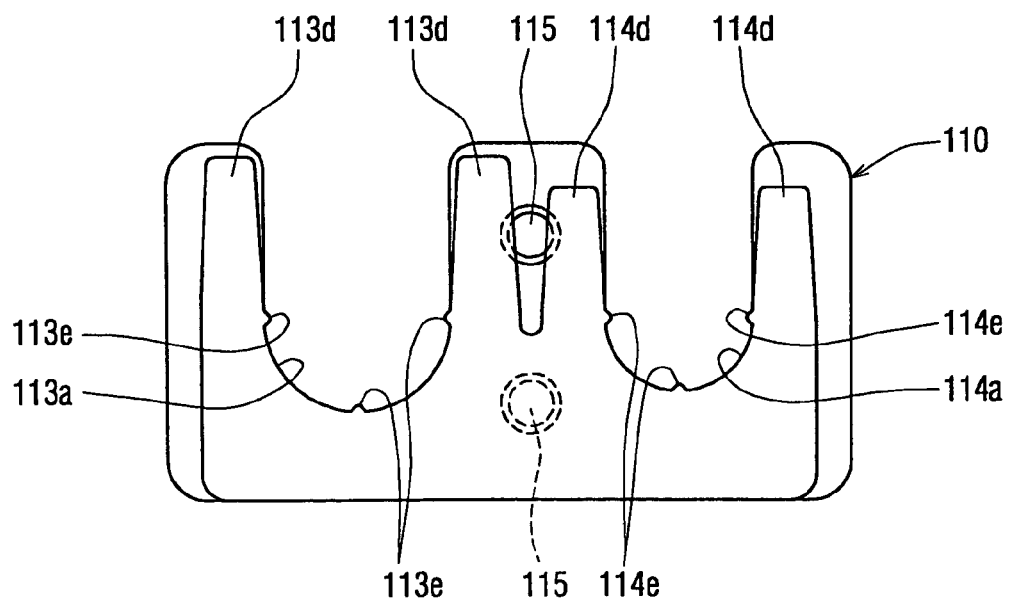
FIG. 12B is a bottom view of the connector of FIG. 12A.

As shown in FIGS. 12A and 12B, two through holes 113a, 114a penetrate through the connector 110 in a thickness direction of the connector 110, which is defined as a direction perpendicular to a plane of the connector 110. The through holes 113a, 114a are for receiving the refrigerant pipes 111, 112, respectively. The through hole 113a is located on one longitudinal end side of the connector 110, and the through hole 114a is located on the other longitudinal end side of the connector 110.

Two bolt receiving holes 115 penetrate through the connector 110 in the thickness direction of the connector 110 at an intermediate longitudinal location between the through hole 113a and the through hole 114a. The connector 110 is secured to a housing of an expansion valve (not shown) by bolts (not shown), which are inserted through the bolt receiving holes 115, respectively.

The through holes 113a, 114a have different diameters to correspond with the refrigerant pipes 111, 112, respectively, and have a U-shaped cross section. More specifically, each through hole 113a, 114a opens radially outward to an exterior of the connector 110 through a corresponding radial opening 113c, 114c, which extends along an entire axial extent of the through hole 113a, 114a. An opening direction of each radial opening 113c, 114c is parallel to a transverse direction B of the connector 110, which is perpendicular to the longitudinal direction of the connector 110.

An enlarged recess 113b, 114b is formed in one axial end of each through hole 113a, 114a in direct communication with the through hole 113a, 114a. An inner diameter of the enlarged recess 113b, 114b is larger than an inner diameter of the through hole 113a, 114a by a predetermined amount. The enlarged recess 113b, 114b is for receiving an annular bulged portion (a protrusion) 116, 117 of the corresponding refrigerant pipe 111, 112.

The inner diameter of the through hole 113a is larger than the outer diameter d11 of the refrigerant pipe 111 by a predetermined amount. Also, the inner diameter of the through hole 114a is larger than the outer diameter d12 of the refrigerant pipe 112 by a predetermined amount. A width (i.e., a size measured in the longitudinal direction of the connector 110) W11, W12 of each radial opening 113c, 114c is generally the same as the inner diameter of the corresponding through hole 113a, 114a. As shown in FIG. 12B, two holding projections 113d, 114d are provided to the other axial end of each through hole 113a, 114a in the connector 110. More specifically, the holding projections 113d, 114d are bounded by the other axial end of the through hole 113a, 114a and extend toward the radial opening 113c, 114c of the through hole 113a, 114a in a plane perpendicular to an axial direction of the through hole 113a, 114a.

After insertion of each refrigerant pipe 111, 112 into the corresponding through hole 113a, 114a, the holding projections 113d, 114d are bent along an outer peripheral surface of the refrigerant pipe 111, 112 in the plane perpendicular to the axial direction of the through hole 113a, 114a to urge the holding projections 113d, 114d against the outer peripheral surface of the pipe 111, 112 and thereby to hold the pipe 111, 112, as shown in FIG. 11. An inner peripheral surface section of the other end of the through hole 113a, 114a, which is bounded by the holding projections 113d, 114d, has a plurality (e.g., three) of radial protuberances 113e, 114e that are arranged one after the other in a circumferential direction of the through hole 113a, 114a. Each radial protuberances 113e, 114*e* protuberates inwardly in the radial direction of the through hole 113*a*, 114*a* and extends in the axial direction of the through hole 113*a*, 114*a*.

When the holding projections 113*d*, 114*d* are bent against the outer peripheral surface of the corresponding pipe 111, 112 received in the corresponding through hole 113*a*, 114*a*, the protuberances 113*e*, 114*e* deform the outer peripheral surface of the corresponding refrigerant pipe 111, 112 to aid in press fitting of the refrigerant pipe 111, 112 into the corresponding through hole 113*a*, 114*a*.

The connector 110 is made of metal. In the third embodiment, the connector 110 is made of an aluminum material. In order to minimize the manufacturing costs, the connector 110 is formed integrally into a shape shown in FIGS. 10A to 12B through a die-casting process. Alternatively, the connector 110 can be formed through a cutting process. However, the manufacturing of the connector 110 through the cutting process disadvantageously causes an increase in the manufacturing costs.

Next, the refrigerant pipes 111, 112 will be described in details. While the refrigerant pipes 111, 112 differ in diameter, they have generally the same shape, as shown in FIG. 10B. The refrigerant pipes 111, 112 are made of metal. In the third embodiment, the refrigerant pipes 111, 112 are made of an aluminum material. More specifically, the aluminum material of the refrigerant pipes 111, 112 can be the aluminum alloy A3003-O, which has a relatively low hardness among various aluminum alloys and thereby allows easy formation of the shape of the pipe 111, 112.

The aluminum material of the connector 110 is an aluminum alloy, which has a higher mechanical strength and a higher hardness in comparison to the aluminum alloy A3003-O to allow the press fitting of the refrigerant pipes 111, 112 to the connector 110, and the bending and urging of the holding projections 113*d*, 114*d* against the outer peripheral surface of the corresponding refrigerant pipe 111, 112.

The bulged portion 116, 117 is formed integrally in each refrigerant pipe 111, 112 near a distal end of the refrigerant pipe 111, 112 through a known bulging process. The bulged portion 116, 117 has an annular shape and protrudes radially outward. A size of each enlarged recess 113*b*, 114*b*, which receives the corresponding bulged portion 116, 117, is larger than the outer diameter of the bulged portion 116, 117 by a predetermined amount. A recessed annular groove 120, 121, which has an annular shape for receiving an O-ring (not shown), is formed through a spinning process on a distal end side of the bulged portion 116, 117 in each refrigerant pipe 111, 112.

Due to the presence of the radial openings 113*c*, 114*c* formed in the connector 110, even in the case of the refrigerant pipe 111, 112, which has a bend (i.e., a curved portion) near the bulged portion 116, 117, the refrigerant pipe 111, 112 can be received into the corresponding through hole 113*a*, 114*a* through the radial opening 113*c*, 114*c* by providing a linear portion at the distal end of the refrigerant pipe 111, 112 and receiving the linear portion into the through hole 113*a*, 114*a* through the radial opening 113*c*, 114*c*. This allows easy installation of the refrigerant pipes 111, 112 to the connector 110.

Next, assembly of the pipe joint structure, which has the above structure, will be described. The connector 110 is previously formed into the shape shown in FIGS. 10A to 12B through the die-casting process before the assembly of the refrigerant pipes 111, 112 to the connector 110. Furthermore, each refrigerant pipe 111, 112 is also previously formed into the shape shown in FIG. 10B. More specifically, each refrigerant pipe 111, 112 is previously formed to have the annular bulged portion 116, 117, the recessed annular groove 120, 121 and the bend (not shown).

Figure 13:
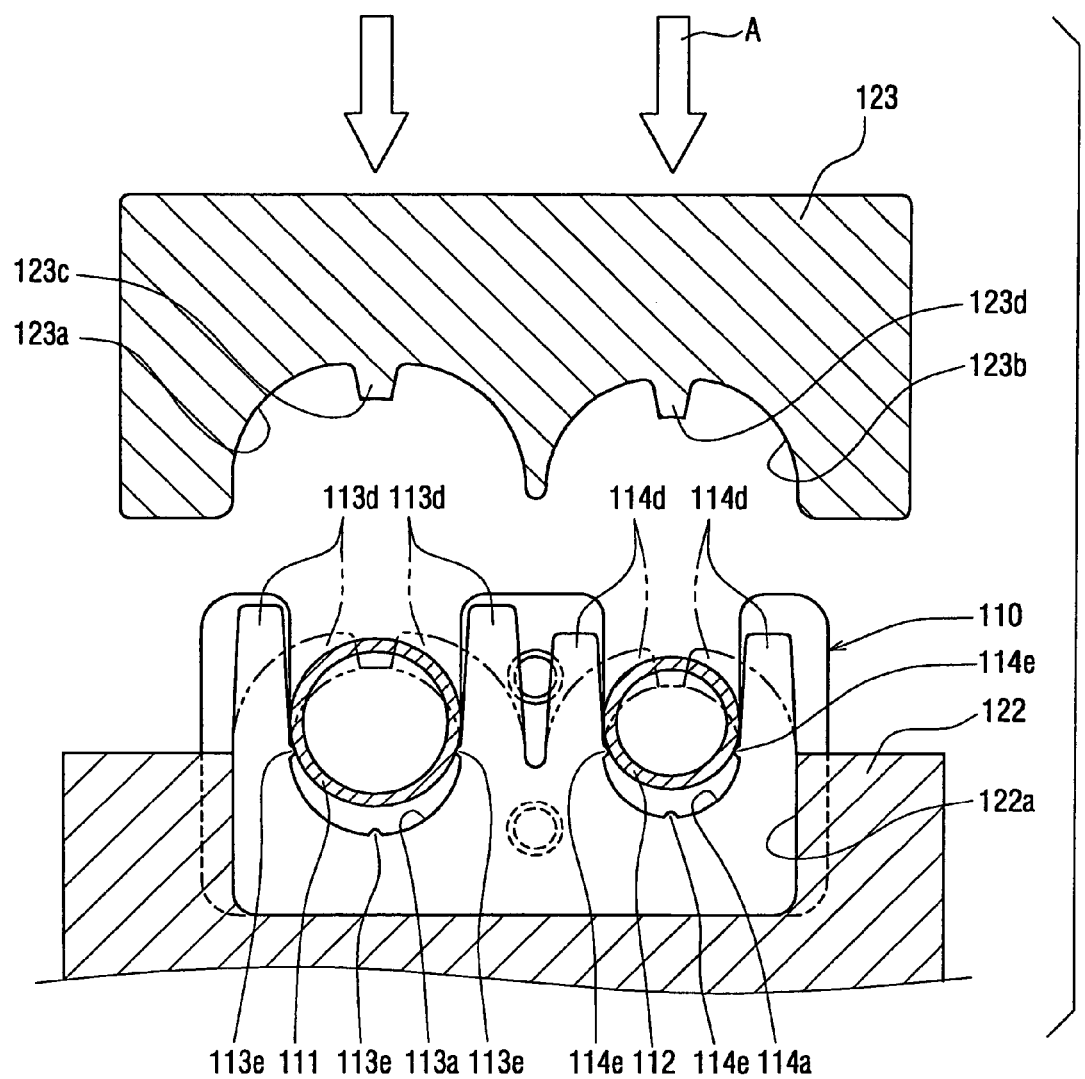
FIG. 13 is a schematic view showing an apparatus used in assembly of the pipe joint structure according to the third embodiment.

FIG. 13 shows a press fitting apparatus for press fitting the refrigerant pipes 111, 112 into the through holes 113*a*, 114*a*, respectively, of the connector 110 by bending the holding projections 113*d*, 114*d* against the outer peripheral surface of the refrigerant pipes 111, 112. As shown in FIG. 13, the press fitting apparatus includes a stationary jig 122 and a movable jig 123. The movable jig 123 is arranged above the stationary jig 122 and is vertically movable relative to the stationary jig 122.

The stationary jig 122 includes a connector receiving recess 122*a*. The movable jig 123 includes two arcuate recesses 123*a*, 123*b*, each of which has a generally arcuate surface. A protuberance 123*c*, 123*d* is formed in a center of the arcuate surface of each arcuate recess 123*a*, 123*b*. Each arcuate recess 123*a*, 123*b* is used to bend the corresponding holding projections 113*d*, 114*d* against the outer peripheral surface of the corresponding refrigerant pipe 111, 112.

First, the connector 110 is received in the connector receiving recess 122*a* of the stationary jig 122, and the refrigerant pipes 111, 112 are received in the through holes 113*a*, 114*a*, respectively. Then, the movable jig 123 is positioned to contact distal ends of the holding projections 113*d*, 114*d*. In this state, the bulged portion 116, 117 of each refrigerant pipe 111, 112 is partially received in the corresponding enlarged recess 113*b*, 114*b*.

Next, a press force is applied from a press apparatus (not shown) to the movable jig 123 in a direction of arrow A in FIG. 13 to depress the movable jig 123 toward the stationary jig 122. At this time, the holding projections 113*d*, 114*d* of the connector 110 are deformed by the corresponding arcuate recess 123*a*, 123*b* of the movable jig 123 in conformity with the generally arcuate surface of the arcuate recess 123*a*, 123*b*, as shown by dot-dot-dash lines in FIG. 13. Furthermore, at the time of bending the holding projections 113*d*, 114*d*, each refrigerant pipe 111, 112 is moved toward a bottom of the corresponding through hole 113*a*, 114*a* of the connector 110 in FIG. 13, so that the outer peripheral surface of the refrigerant pipe 111, 112, which is moved toward the bottom of the through hole 113*a*, 114*a*, is deformed by the corresponding radial protuberances 113*e*, 114*e*.

In this way, each refrigerant pipe 111, 112 is securely press fitted into the corresponding through hole 113*a*, 114*a* against the radial protuberances 113*e*, 114*e* and is securely held by the corresponding holding projections 113*d*, 114*d*, which are bent and are urged against the outer peripheral surface of the refrigerant pipe 111, 112. FIG. 13 shows a state before engagement of the arcuate recesses 123*a*, 123*b* of the movable jig 123 against the distal ends of the holding projections 113*d*, 114*d*. When a lower end of the movable jig 123 contacts a top end surface of the stationary jig 122, both the press fitting step and the bending and urging step end.

The pipe joint structure and the manufacturing method thereof according to the third embodiment provide the following advantages. That is, each refrigerant pipe 111, 112 is securely held by the connector 110 through the step of press fitting the refrigerant pipe 111, 112 into the through hole 113*a*, 114*a* and also through the step of bending and urging the holding projections 113*d*, 114*d* against the outer peripheral surface of the refrigerant pipe 111, 112. Thus, the connecting strength for connecting between the connector 110 and each refrigerant pipe 111, 112 is significantly increased. Therefore, for example, after the press fitting step and the bending and urging step, even when an external force, such as a torsional force or a flexural force, is applied to the refrigerant pipe 111, 112, detachment of the refrigerant pipe 111, 112 from the connector 110 can be advantageously limited.

Because of the connection, which is made by the press fitting of each refrigerant pipe 111, 112 into the corresponding through hole 113a, 114a, and also the connection, which is made by the bending and urging of the holding projections 113d, 114d against the outer peripheral surface of the refrigerant pipe 111, 112, the refrigerant pipe 111, 112 is connected to the connector 110 to achieve a relatively high torsional strength and also a relatively high flexural strength at these connections. Thus, after the press fitting step and the bending and urging step, even when the external force is applied to the refrigerant pipe 111, 112, the refrigerant pipe 111, 112 will not be easily removed from the connector 110.

Because of the radial protuberances 113e, 114e, which extend in the axial direction and are arranged in the circumferential direction of the through hole 113a, 114a, the outer peripheral surface of the refrigerant pipe 111, 112 is deformed by the radial protuberances 113e, 114e at the time of press fitting the refrigerant pipe 111, 112 into the corresponding through hole 113a, 114a. Thus, the refrigerant pipe 111, 112 is securely held in the through hole 113a, 114a with aid of the radial protuberances 113e, 114e. In this way, the connecting strength for connecting between the connector 110 and each refrigerant pipe 111, 112 is improved over the prior art, in which the bulged portion 116, 117 of each pipe 111, 112 is press fitted into the enlarged recess 113b, 114b of the connector 110.

Each refrigerant pipe 111, 112 is made of the aluminum alloy, and the connector 110 is made of the aluminum alloy, which has the hardness greater than that of the aluminum alloy of the refrigerant pipe 111, 112. Through use of the aluminum alloy, which has the relatively low hardness, the formability of each refrigerant pipe 111, 112 is improved. Furthermore, the deformation of each refrigerant pipe 111, 112 at the time of press fitting the refrigerant pipe 111, 112 into the through hole 113a, 114a of the connector 110 can be performed smoothly. In addition, since the connector 110 is made of the aluminum alloy, which has the relatively high hardness, the required strength of the connector 110 can be easily achieved. Also, each refrigerant pipe 111, 112 can be effectively, securely held by the corresponding holding projections 113d, 114d.

The connector 110 is constructed to hold the multiple refrigerant pipes 111, 112. Thus, at least a feed pipe and a return pipe of the refrigerant pipe arrangement of the refrigeration cycle can be integrally held by the connector 110. Therefore, the connector 110 is suitable for the refrigerant pipe joint of the refrigeration cycle of the vehicle air conditioning system.

Furthermore, the bending of the holding projections 113d, 114d against the outer peripheral surface of the corresponding refrigerant pipe 111, 112 causes simultaneous achievement of the step of press fitting the refrigerant pipe 111, 112 into the through hole 113a, 114a and the step of bending and urging the holding projections 113d, 114d against the outer peripheral surface of the refrigerant pipe 111, 112. Thus, the manufacturing costs can be minimized.

Fourth Embodiment

In the third embodiment, the multiple radial protuberances 113e, 114e, which extend in the axial direction and are arranged in the circumferential direction of the through hole 113a, 114a, are provided in each through hole 113a, 114a at the inner peripheral surface section of the other end of the through hole 113a, 114a to achieve the secure press fitting of the refrigerant pipe 111, 112 into the corresponding through hole 113a, 114a. However, the present invention is not limited to this. For example, each through hole 113a, 114a can be formed to have a polygonal cross section.

Figure 14A:
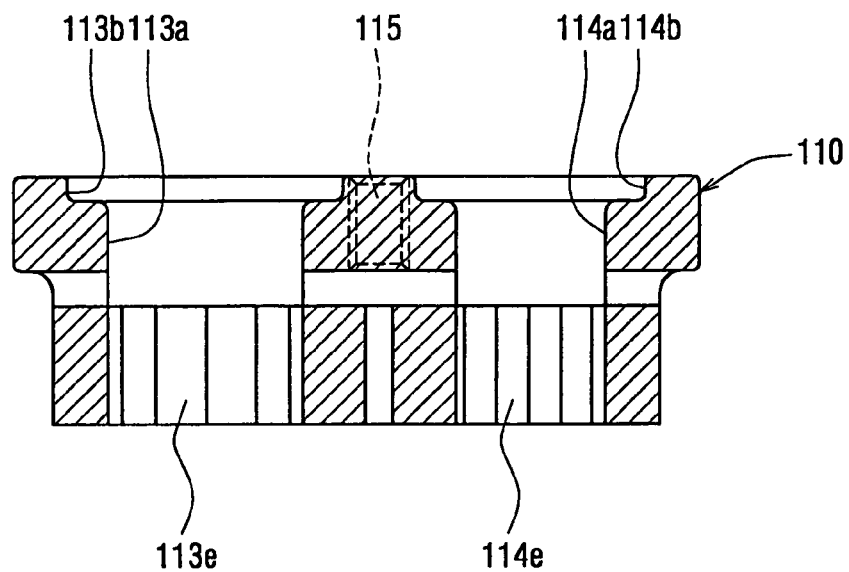
FIG. 14A is a cross sectional view of a connector according to a fourth embodiment of the present invention.
Figure 14B:
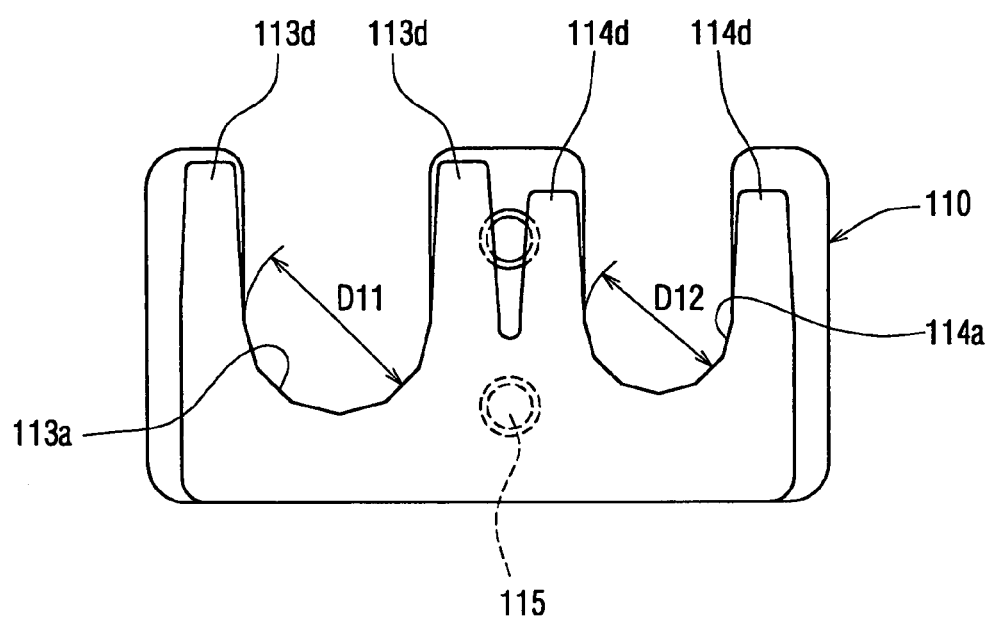
FIG. 14B is a bottom view of the connector shown in FIG. 14A.

In a fourth embodiment, as shown in FIGS. 14A and 14B, each through hole 113a, 114a has a polygonal cross section at the other axial end of the through hole 113a, 114a where the holding projections 113d, 114d are arranged. More specifically, each through hole 113a, 114a has a dodecagonal cross section. A diameter D11, D12 of each imaginary inscribed circle, which inscribes a polygonal inner peripheral surface of the corresponding through hole 113a, 114a, is larger than the outer diameter d11, d12 of the corresponding refrigerant pipe 111, 112 by a predetermined amount. In FIGS. 14A and 14B, it should be noted that the components, which are the same as those of the third embodiment, are indicated by the similar numerals and will not be described further for the sake of simplicity.

With the above arrangement, each refrigerant pipe 111, 112 is press fitted into the corresponding through hole 113a, 114a in such a manner that the outer peripheral surface of the refrigerant pipe 111, 112 is deformed to correspond with the polygonal inner peripheral surface of the through hole 113a, 114a. Thus, the refrigerant pipe 111, 112 is effectively held in the through hole 113a, 114a.

Figure 15:
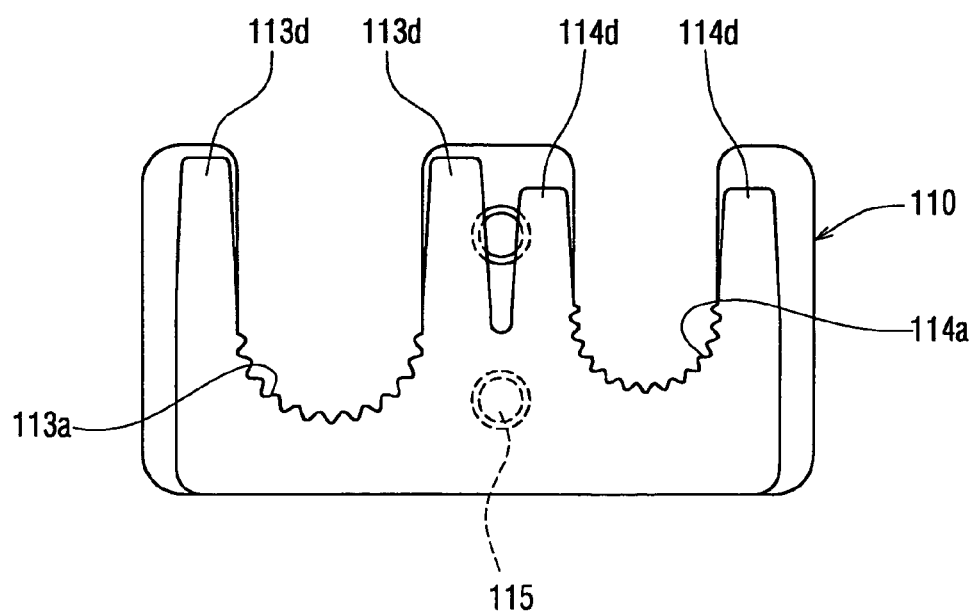
FIG. 15 is a bottom view of a modification of the connector of the fourth embodiment.

Furthermore, in the fourth embodiment, the portion of each through hole 113a, 114a, at which the holding projections 113d, 114d are arranged, has the polygonal cross section. The polygonal cross section of each through hole 113a, 114a can be defined as a non-circular cross section, which has a plurality of radially close sections and a plurality of radially remote sections. Each radially close section is radially closer to an imaginary inscribed circle, which inscribes the inner peripheral surface section of the other end of the through hole 113a, 114a, in comparison to the radially remote sections. The radially close sections and the radially remote sections are alternately arranged in the circumferential direction of the through hole 113a, 114a. Thus, the polygonal cross section of each through hole 113a, 114a is not limited to the above described one shown in FIGS. 14A and 14B, and as shown in FIG. 15, the cross section of each through hole 113a, 114a can have a serrated shape, which resembles a toothed edge.

In the third and fourth embodiments, the bulged portion 116, 117 of each refrigerant pipe 111, 112 is not press fitted into the corresponding enlarged recess 113b, 114b of the connector 110. However, like the first and second embodiments, the bulged portion 116, 117 of each refrigerant pipe 111, 112 may be constructed to be press fitted into the corresponding enlarged recess 113b, 114b of the connector 110, if desired.

Fifth Embodiment

A pipe joint structure according to a fifth embodiment of the present invention will be described. The pipe joint structure of the fifth embodiment is used in a refrigerant pipe arrangement of a refrigeration cycle of a vehicle air conditioning system.

Figure 16A:
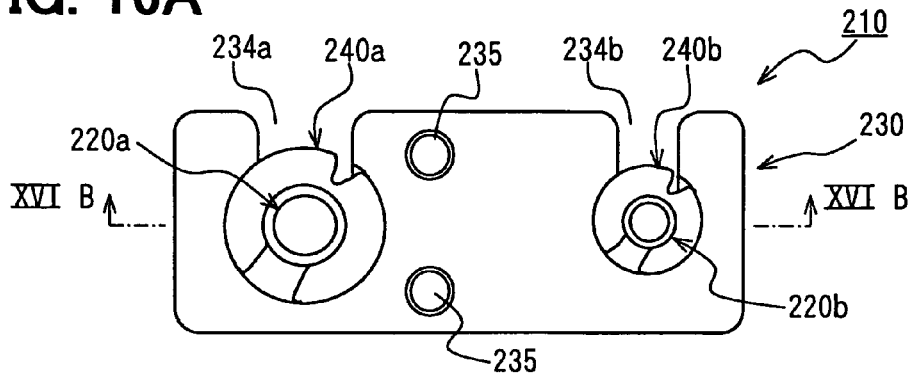
FIG. 16A is a schematic plan view of a pipe joint structure according to a fifth embodiment of the present invention.
Figure 16B:
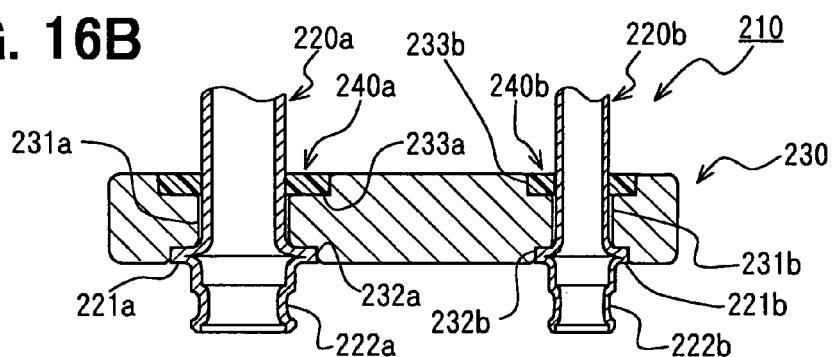
FIG. 16B is a cross sectional view taken along line XVIB-XVIB in FIG. 16A.
Figure 17A:
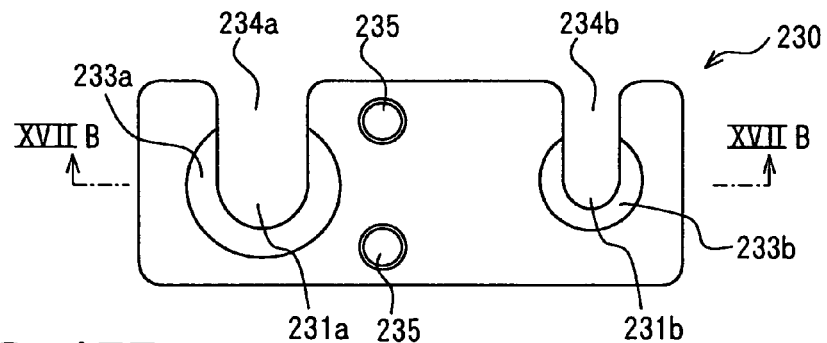
FIG. 17A is a plan view of a connector of the pipe joint structure of FIGS. 16A and 16B.
Figure 17B:
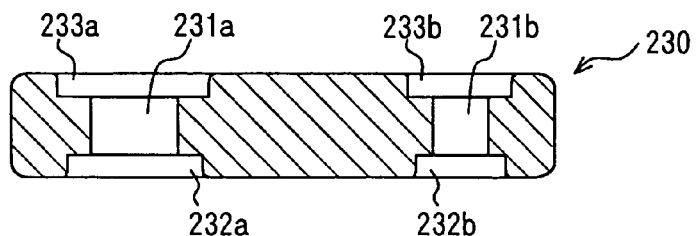
FIG. 17B is a cross sectional view taken along line XVIIB-XVIIB in FIG. 17A.

With reference to FIGS. 16A and 16B, the pipe joint structure 210 of the fifth embodiment includes two refrigerant pipes 220a, 220b, a connector 230 and two securing members 240a, 240b. The connector 230 securely holds the refrigerant pipes 220a, 220b. Each securing member 240a, 240b is arranged between the connector 230 and a corresponding one of the refrigerant pipes 220a, 220b.

Each refrigerant pipe 220a, 220b is made of metal. In the fifth embodiment, each refrigerant pipe 220a, 220b is made of an aluminum alloy, which has a relatively low hardness. The refrigerant pipe 220a has a relatively large outer diameter and serves as a low pressure side refrigerant pipe of the refrigeration cycle. The refrigerant pipe 220b has a relatively small outer diameter in comparison to the outer diameter of the refrigerant pipe 220a and serves as a high pressure side refrigerant pipe of the refrigeration cycle. A distal end (not shown) of the refrigerant pipe 220a is connected to a low pressure refrigerant outlet of an undepicted expansion valve (a depressurizing means), and the refrigerant pipe 220b is connected to a high pressure side refrigerant inlet of the expansion valve.

Although the outer diameters of the refrigerant pipes 220a, 220b differ from each other, the refrigerant pipes 220a, 220b have generally the same shape. An annular bulged portion (a protrusion) 221a, 221b protrudes radially outward near the distal end of each refrigerant pipe 220a, 220b. The bulged portion 221a, 221b of each refrigerant pipe 220a, 220b is larger than a corresponding first side recess 232a, 232b of the connector 230 by a predetermined amount, so that the bulged portion 221a, 221b can be securely press fitted into the corresponding first side recess 232a, 232b. Furthermore, each bulged portion 221a, 221b is formed integrally in the refrigerant pipe 220a, 220b by a known process (e.g., a bulging process).

A recessed annular groove 222a, 222b, which has an annular shape for receiving an O-ring (not shown), is formed on a distal end side of the bulged portion 221a, 221b in each refrigerant pipe 220a, 220b.

The connector 230 is made of metal. In the fifth embodiment, the connector 230 is made of an aluminum alloy, which has a relatively high hardness in comparison to the aluminum alloy of each refrigerant pipe 220a, 220b. As shown in FIGS. 16A-17B, two through holes 231a, 231b penetrate through the connector 230 to receive the refrigerant pipes 220a, 220b, respectively. Each first side recess 232a, 232b is formed at one axial end of a corresponding one of the through holes 231a, 231b. A second side recess 233a, 233b is formed at the other axial end of each through hole 231a, 231b.

Each through hole 231a, 231b penetrates through the connector 230 in a thickness direction of the connector 230, which is defined as a direction perpendicular to a plane of the connector 230. The pipes 220a, 220b are received through the through holes 231a, 231b, respectively. Furthermore, an inner diameter of each through hole 231a, 231b is larger than the outer diameter of the corresponding refrigerant pipe 220a, 220b by a predetermined amount. The through hole 231a, 231b of the fifth embodiment have different inner diameters but have generally the same shape.

As discussed above, the first side recesses 232a, 232b are provided at the one axial ends, respectively, of the through holes 231a, 231b. The bulged portions 221a, 221b are press fitted into the first side recesses 232a, 232b, respectively, of the connector 230. A shape of each first side recess 232a, 232b is not limited to any particular one as long as the bulged portion 221a, 221b of the corresponding refrigerant pipe 220a, 220b can be securely press fitted into the first side recess 232a, 232b. For example, in a case where each through hole 231a, 231b has an arcuate cross section, the corresponding first side recess 232a, 232b can have an arcuate cross section that has the center of the arc that coincides with the center of the arc of the through hole 231a, 231b. Alternatively, each first side recess 232a, 232b can have a polygonal cross section. Furthermore, a contact surface of each first side recess 232a, 232b, which contacts the bulged portion 221a, 221b, can have concaves and convexes or a rough surface. In the fifth embodiment, the two first side recesses 232a, 232b have different diameters but have generally the same shape.

Furthermore, the contact surface of each first side recess 232a, 232b, which contacts the bulged portion 221a, 221b, has the concaves and convexes (not shown). Also, each first side recess 232a, 232b is smaller than the outer diameter of the corresponding bulged portion 221a, 221b by a predetermined amount. A boundary between each first side recess 232a, 232b and its adjacent end surface of the connector 230 is tapered to allow easy press fitting of the bulged portion 221a, 221b of the refrigerant pipe 220a, 220b into the first side recess 232a, 232b.

As discussed above, each second side recess 233a, 233b is provided to the other end of the corresponding through hole 231a, 231b. The shape of the second side recess 233a, 233b is not limited to any particular one as long as the corresponding securing member 240a, 240b can be securely press fitted into the second side recess 233a, 233b. For example, similar to the first side recesses 232a, 232b, each second side recess 233a, 233b can have an arcuate cross section, which has the center of the arc that coincides with the center of the arc of the through hole 231a, 231b. Alternatively, each second side recess 233a, 233b can have a polygonal cross section. Furthermore, a contact surface of each second side recess 233a, 233b, which contacts the securing member 240a, 240b, can have concaves and convexes or a rough surface. In the fifth embodiment, the two second side recesses 233a, 233b have different diameters but have generally the same shape. Furthermore, each second side recess 233a, 233b has the arcuate cross section, which has the center of the arc that coincides with the center of the arc of the through hole 231a, 231b. Also, each second side recess 233a, 233b is smaller than the outer diameter of the corresponding securing member 240a, 240b by a predetermined amount. A boundary between each second side recess 233a, 233b and its adjacent end surface of the connector 230 is tapered to allow easy press fitting of the corresponding securing member 240a, 240b into the second side recess 233a, 233b.

As discussed above, the connector 230 has the two through holes 231a, 231b, each of which has the first side recess 232a, 232b and the second side recess 233a, 233b at its axial ends, respectively. Since the connector 230 is made of the aluminum alloy, the connector 230 can be formed integrally through a die-casting process. In this way, the manufacturing costs can be minimized.

In the connector 230 of the fifth embodiment, each through hole 231a, 231b opens radially outward to an exterior of the connector 230 through a corresponding radial opening (a refrigerant pipe insertion opening) 234a, 234b, which axially extends along an entire axial extent of the through hole 231a, 231b to axially extends through the first side recess 232a, 232b and the second side recess 233a, 233b. In general, in a case where each through hole 231a, 231b has no radial opening 234a, 234b, when each refrigerant pipe 220a, 220b has a bend (i.e., a curved portion) or when each refrigerant pipe 220a, 220b has large diameter portions, which are larger than the corresponding through hole 231a, 231b, near the axial ends of the through hole 231a, 231b, the refrigerant pipe 220a, 220b cannot be inserted into the through hole 231a, 231b. However, due to the provision of the radial opening 234a, 234b, such a refrigerant pipe 220a, 220b can be inserted into the through hole 231a, 231b through the radial opening 234a, 234b. That is, the bend can be formed in the refrigerant pipe 220a, 220b. In other words, a degree of freedom in terms of the shape of the refrigerant pipe 220a, 220b is increased. Thus, the shape of the pipe joint structure 10 can be adjusted to correspond with a designated accommodating space, which accommodates the pipe joint structure 10.

Two bolt receiving holes 235 penetrate through the connector 230 in the same direction as that of each through hole 231a, 231b at an intermediate longitudinal location between the through hole 231a and the through hole 231b. The connector 230 is secured to a housing (not shown) of the expansion valve by bolts (not shown), which are inserted through the bolt receiving holes 235, respectively.

Each securing member 240a, 240b is made of a resin material or a metal material, such as an aluminum material. In the fifth embodiment, each securing member 240a, 240b is made of a resiliently deformable resin. The securing members 240a, 240b are press fitted into the second side recesses 233a, 233b, respectively. The shape of each securing member 240a, 240b is not limited to any particular one as long as the securing member 240a, 240b can be press fitted into the corresponding second side recess 233a, 233b. As shown in FIGS. 16A-16B and 18A-18B, the securing members 240a, 240b have different sizes but are formed into a generally C-shape (a generally C-shaped body). More specifically, each securing member 240a, 240b includes a radial opening 241a, 241b, a holding portion 242a, 242b and a thin wall portion 243a, 243b. The radial opening 241a, 241b serves as an opening, through which the corresponding refrigerant pipe 220a, 220b is inserted into the securing member 240a, 240b. The holding portion 242a, 242b is for securely holding the refrigerant pipe 220a, 220b. The thin wall portion 243a, 243b is for promoting insertion of the refrigerant pipe 220a, 220b through the radial opening 241a, 241b. The thin wall portion 243a, 243b has a smaller radial wall thickness in comparison to an adjacent section of the securing member 240a, 240b, which is adjacent to the thin wall portion 243a, 243b.

Figure 18A:
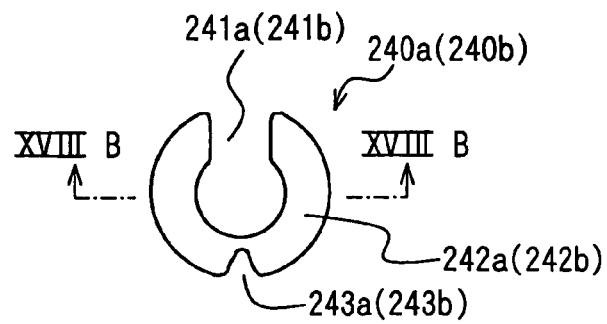
FIG. 18A is a plan view of a securing member of the pipe joint structure shown in FIGS. 16A and 16B.
Figure 18B:
FIG. 18B is a cross sectional view taken along line XVIIIB-XVIIIB in FIG. 18A.

A width of each radial opening 241a, 241b measured in the left-right direction in FIG. 18A is smaller than the outer diameter of the corresponding refrigerant pipe 220a, 220b. However, each securing member 240a, 240b is made of the resiliently deformable resin and includes the thin wall portion 243a, 243b in an outer peripheral part of the securing member 240a, 240b, and the thin wall portion 243a, 243b is diametrically opposed to the radial opening 241a, 241b. Thus, each securing member 240a, 240b can be deformed in a corresponding direction to increase the width (the size measured in the left-right direction in FIG. 18A) of the radial opening 241a, 241b of the securing member 240a, 240b to receive the corresponding refrigerant pipe 220a, 220b into the holding portion 242a, 242b through the radial opening 241a, 241b. Furthermore, an inner diameter of the holding portion 242a, 242b is generally the same or slightly smaller than the outer diameter of the corresponding refrigerant pipe 220a, 220b. Thus, before the press fitting of the securing member 240a, 240b into the corresponding second side recess 233a, 233b of the connector 230, the securing member 240a, 240b can be temporarily fixed to the refrigerant pipe 220a, 220b. As a result, positioning of the securing member 240a, 240brelative to the corresponding second side recess 233a, 233b of the connector 230 is relatively easy at the time of press fitting the securing member 240a, 240b against the second side recess 233a, 233b. The inner diameter of the holding portion 242a, 242b is not necessarily the same or slightly smaller than the outer diameter of the corresponding refrigerant pipe 220a, 220b. It is only required that the inner diameter of the holding portion 242a, 242bof each securing member 240a, 240b allows the resilient deformation of the securing member 240a, 240b to securely hold the corresponding refrigerant pipe 220a, 220b at the corresponding second side recess 233a, 233b at the time of press fitting of the securing member 240a, 240b into the second side recess 233a, 233b.

In the fifth embodiment, as discussed above, each securing member 240a, 240b is formed into the generally C-shape and has the thin wall portion 243a, 243b. Thus, even when each refrigerant pipe 220a, 220b has the bend or even when each refrigerant pipe 220a, 220b has the large diameter portions, which can not be received in the corresponding holding portion 242a, 242b, near the axial ends of the holding portion 242a, 242b, 231b, such a refrigerant pipe 220a, 220b can be radially received into the holding portion 242a, 2b through the radial opening 241a, 241b. Furthermore, although the securing member 240a, 240b has the radial opening 241a, 241b, a relatively large contact surface area between the refrigerant pipe 220a, 220b and the securing member 240a, 240b can be obtained. Thus, at the time of press fitting the securing member 240a, 240b into the second side recess 233a, 233b, the refrigerant pipe 220a, 220b can be securely held by the connector 230.

In the pipe joint structure 10, each refrigerant pipe 220a, 220b is received in the corresponding through hole 231a, 231b of the connector 230, and then the bulged portion 221a, 221b of the refrigerant pipe 220a, 220b is press fitted into the corresponding first side recess 232a, 232b. Also, each securing member 240a, 240b is press fitted into the corresponding second side recess 233a, 233b. Thus, each refrigerant pipe 220a, 220b is secured to the connector 230 at two axial locations. As a result, it is possible to limit vibrations of the refrigerant pipes 220a, 220b, which would be caused by vibrations generated at the time of moving from one assembling stage to another assembling stage before securing of the refrigerant pipes 220a, 220b and the connector 230 to the expansion valve. That is, removal of the refrigerant pipes 220a, 220b from the connector 230 can be more effectively limited to maintain the integrity of the pipe joint structure 10.

Next, a manufacturing method (an assembling method) of the pipe joint structure 10 according to the fifth embodiment will be described with reference to FIGS. 19A and 19B.

The refrigerant pipes 220a, 220b, the connector 230 and the securing members 240a, 240b, which constitute the pipe joint structure 10, are prepared in advance. In the fifth embodiment, the second side recesses 233a, 233b are formed in the connector 230 together with the through holes 231a, 231b and the first side recesses 232a, 232b through the die-casting process.

Then, the press fitting process is performed using a press fitting apparatus 250. The press fitting apparatus 250 includes a stationary jig 251 and a movable jig (a pressurizing jig) 252. The movable jig 252 is arranged above the stationary jig 251 and is vertically movable relative to the stationary jig 251.

Figure 19A:
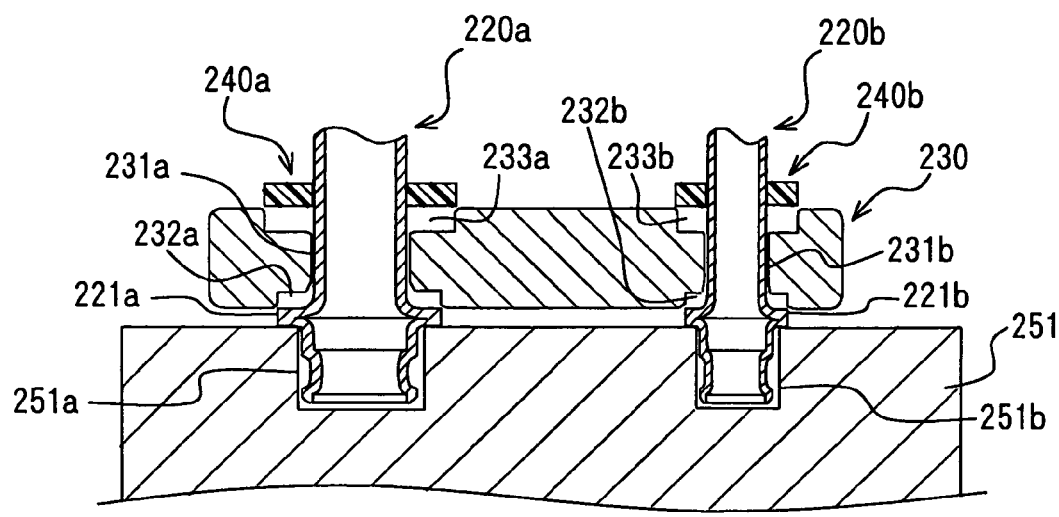
FIG. 19A is a schematic cross sectional view showing one stage of an assembling process of the pipe joint structure according to the fifth embodiment before press fitting of bulged portions of refrigerant pipes and securing members into the connector.

As shown in FIG. 19A, the stationary jig 251 includes positioning recesses 251a, 251b. Each positioning recess 251a, 251b receives a distal end section of the corresponding refrigerant pipe 220a, 220b, which is located distally of the bulged portion 221a, 221b of the refrigerant pipe 220a, 220b, in such a manner that the bulged portion 221a, 221b contacts a top end surface of the stationary jig 251. In this way, each refrigerant pipe 220a, 220b is positioned relative to the stationary jig 251.

Next, the connector 230 is positioned in such a manner that each refrigerant pipe 220a, 220b is received in the corresponding through hole 231a, 231b of the connector 230. Then, each securing member 240a, 240b is positioned relative to the corresponding refrigerant pipe 220a, 220b in such a manner that the refrigerant pipe 220a, 220b is fitted into the holding portion 242a, 242b of the corresponding securing member 240a, 240b.

Figure 19B:
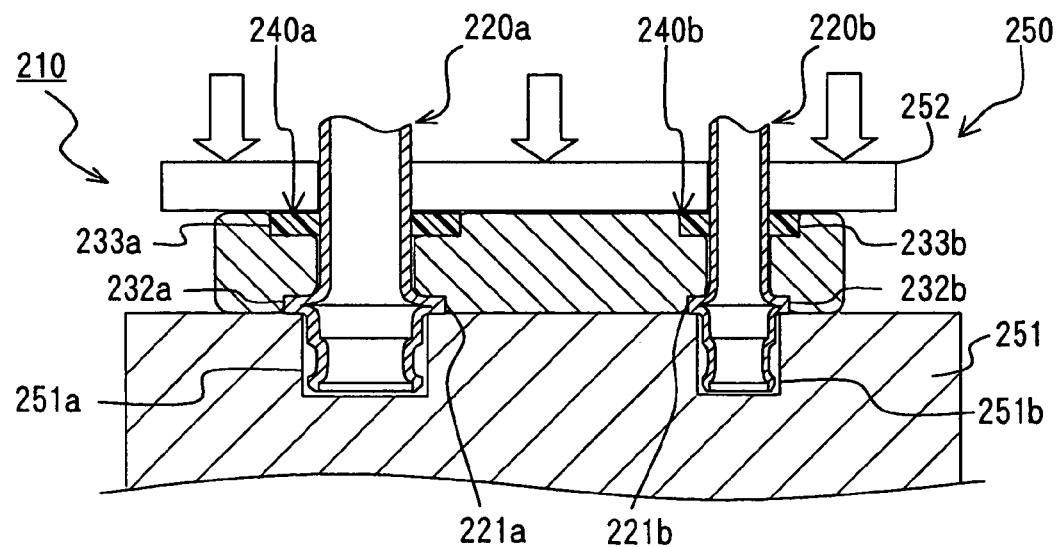
FIG. 19B a schematic cross sectional view showing another stage of the assembling process of the pipe joint structure according to the fifth embodiment after the press fitting of the bulged portions of the refrigerant pipes and the securing members into the connector.

Then, as shown in FIG. 19B, a pressure is applied to the securing members 240a, 240b and the connector 230 from the movable jig 252 in a direction of arrows toward the stationary jig 251 to depress the securing members 240a, 240b and the connector 230 toward the stationary jig 251. At this time, the bulged portion 221a, 221b of each refrigerant pipe 220a, 220b is press fitted into the corresponding first side recess 232a, 232b of the connector 230 and is deformed in conformity with the shape of the first side recess 232a, 232b (i.e., the shape of an inner peripheral surface of the first side recess 232a, 232b, which has the concaves and the convexes). Thus, the outer peripheral surface of the bulged portion 221a, 221b is tightly engaged with the inner peripheral surface of the first side recess 232a, 232b, and this step will be referred to as a first press fitting step. Therefore, the refrigerant pipes 220a, 220b are securely held by the connector 230.

Also, each securing member 240a, 240b is press fitted into the corresponding second side recess 233a, 233b by the pressure force exerted from the movable jig 252 and is deformed in conformity with the shape of the corresponding refrigerant pipe 220a, 220b and the corresponding second side recess 233a, 233b. Thus, the holding portion 242a, 242b of each securing member 240a, 240b is tightly engaged with the corresponding refrigerant pipe 220a, 220b, and the outer peripheral surface of the securing member 240a, 240b tightly engages the inner peripheral surface of the corresponding second side recess 233a, 233b. This step will be referred to as a second press fitting step. Therefore, each refrigerant pipe 220a, 220b is securely held by the connector 230 through the corresponding securing member 240a, 240b.

As a result, each refrigerant pipe 220a, 220b is securely held at two locations, i.e., at the corresponding first side recess 232a, 232b and the corresponding second side recess 233a, 233b, which are spaced from each other in the longitudinal direction of the refrigerant pipe 220a, 220b. Thus, movement of each refrigerant pipe 220a, 220b, which is caused by vibrations, is more effectively limited, so that removal of the refrigerant pipe 220a, 220b from the connector 230 can be more effectively limited. Furthermore, each refrigerant pipe 220a, 220b is stably secured to the connector 230 by the simple mechanical method, i.e., by the press fitting without a need to braze the refrigerant pipe 220a, 220b to the connector 230. As a result, the pipe joint structure 10 can be manufactured at the low costs.

In the fifth embodiment, the first press fitting step and the second press fitting step are performed simultaneously. Thus, the manufacturing of the pipe joint structure 10 is simplified. However, it should be noted that the first press fitting step and the second press fitting step can be performed separately from one another.

The fifth embodiment can be modified in various ways without departing from the scope and spirit of the invention.

For example, in the fifth embodiment, the shape of the bulged portion 221a, 221b of each refrigerant pipe 220a, 220b is annular. However, the shape of the bulged portion 221a, 221b of the refrigerant pipe 220a, 220b is not limited to the annular shape and can be modified to any other appropriate shape that allows press fitting of the bulged portion 221a, 221b of the refrigerant pipe 220a, 220b into the corresponding first side recess 232a, 232b of the connector 230.

In the fifth embodiment, the two refrigerant pipes 220a, 220b are held by the single connector 230. However, the present invention can be equally applied to another type of pipe joint structure, in which a single pipe (refrigerant pipe) is secured to a single connector.

Figure 20:
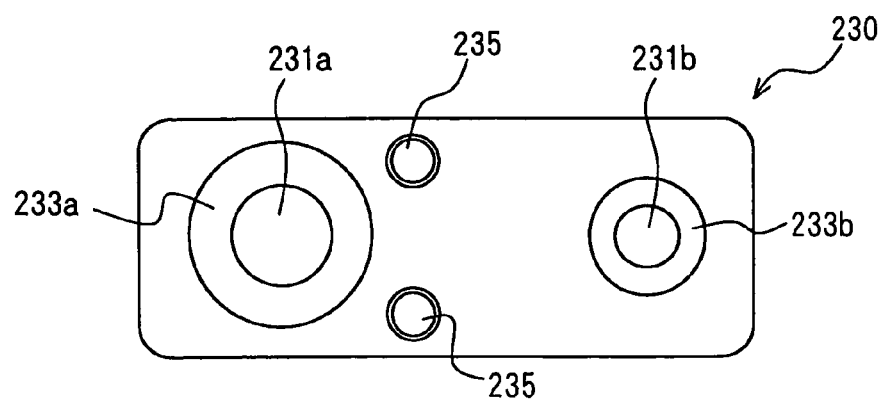
FIG. 20 is a plan view showing a modification of the connector of the fifth embodiment.

In the fifth embodiment, the connector 230 has the radial openings 234a, 234b, through which the refrigerant pipes 220a, 220b are fitted into the through holes 231a, 231b, respectively. However, as shown in FIG. 20, the connector 230 is not required to have the radial openings 234a, 234b. In the case where the radial openings 234a, 234b are eliminated from the connector 230, the refrigerant pipes 220a, 220b need to be inserted through the through holes 231a, 231b of the connector 230, and thereby, there are more limitations with respect to the shape of the refrigerant pipe 220a, 220b. FIG. 20 is a plan view, showing this modification of the connector 230.

Figure 21A:
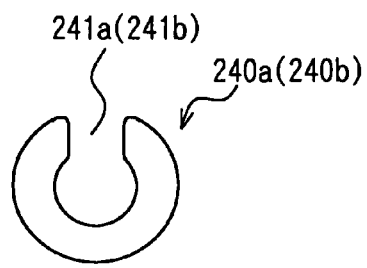
FIG. 21A is a plan view showing a modification of the securing member of the fifth embodiment.
Figure 21B:
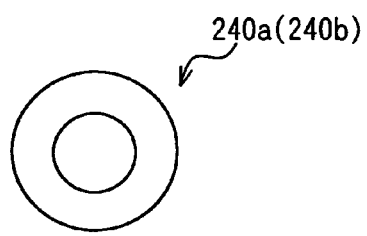
FIG. 21B is a plan view showing another modification of the securing member of the fifth embodiment.
Figure 21C:
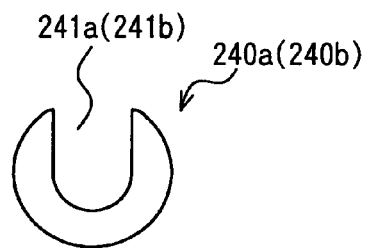
FIG. 21C is a plan view showing a further modification of the securing member of the fifth embodiment.

In the fifth embodiment, each securing member 240a, 240b is formed into the generally C-shaped body, which has the thin wall portion 243a, 243b. However, the shape of each securing member 240a, 240b is not limited to the above one and can be modified to any other appropriate shape, which allows press fitting of the securing member 240a, 240b into the corresponding second side recess 233a, 233b to fill a gap between the outer peripheral surface of the refrigerant pipe 220a, 220b and the inner peripheral surface of the second side recess 233a, 233b of the connector 230 and thereby to establish tight engagement between the outer peripheral surface of the refrigerant pipe 220a, 220b and the inner peripheral surface of the second side recess 233a, 233b. For example, in the case where each securing member 240a, 240b is made of the resiliently deformable resin, as shown in FIG. 21A, each securing member 240a, 240b can be formed into a generally C-shaped body, which does not have the thin wall portion 243a, 243b. Furthermore, in the case where each securing member 240a, 240b is made of the metal or the resin, as shown in FIG. 21B, each securing member 240a, 240b can be formed into an annular shaped body, which has a through hole for receiving the corresponding refrigerant pipe 220a, 220b therethrough. Also, as shown in FIG. 21C, each securing member 240a, 240b can be formed into a generally U-shaped body, which has a radial opening 241a, 241b that has a width substantially the same as the outer diameter of the refrigerant pipe 220a. However, in the case of the annular shaped securing member 240a, 240b shown in FIG. 21B, the corresponding refrigerant pipe 220a, 220b needs to be inserted through the through hole of the securing member 240a, 240b, and thereby, there are more limitations with respect to the shape of the refrigerant pipe 220a, 220b. In the cases of FIGS. 21A and 21C, each refrigerant pipe 220a, 220b can be fitted to the corresponding securing member 240a, 240b through the radial opening 241a, 241b. However, in the case of FIG. 21A, depending on the material of the securing member 240a, 240b, a twist may be generated in the securing member 240a, 240b. In the case of FIG. 21C, a contact area of the securing member 240a, 240b, which contacts the corresponding refrigerant pipe 220a, 220b to hold it, is reduced in comparison to the generally C-shaped securing member 240a, 240b. Accordingly, it is preferred that each securing member 240a, 240b is formed into the generally C-shaped body, which has the thin wall portion 243a, 243b.

Figure 22A:
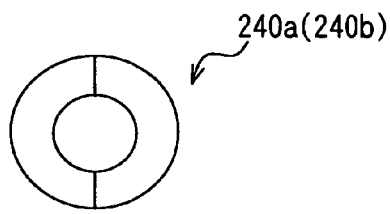
FIG. 22A is a plan view showing a further modification of the securing member of the fifth embodiment.
Figure 22B:
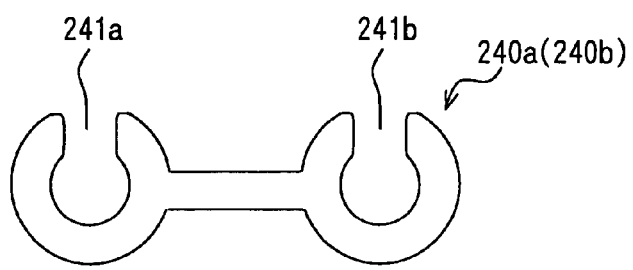
FIG. 22B is a plan view showing a further modification of the securing member of the fifth embodiment.

In the fifth embodiment, each securing member 240a, 240b is made of the single component. Alternatively, each securing member 240a, 240b can be made of a plurality of components. For example, as shown in FIG. 22A, each securing member 240a, 240b can be made of two components, which cooperate together to form an annular body. In the fifth embodiment, one securing member 240a, 240b is provided to each refrigerant pipe 220a, 220b. However, the two second side recesses 233a, 233b of the connector 230 can be connected to each other through, for example, a groove, and as shown in FIG. 22B, and a single securing member 240a (or 240b), which are common to the two second side recesses 233a, 233b and are press fitted into the two second side recesses 233a, 233b, can be provided. In this case, the two (i.e., the multiple) refrigerant pipes 220a, 220b are securely held by the single securing member 240a (or 240b). Thus, the number of the components can be minimized.

Additional advantages and modifications will readily occur to those skilled in the art. The invention in its broader terms is therefore not limited to the specific details described above.

What is claimed is:

1. A pipe joint structure comprising:
   a connector having opposed first and second axial end faces;
   a through hole that extends in the connector from the second axial end face of the connector toward the first axial end face of the connector;
   a recess that is recessed in the first axial end face of the connector and extends outward from an inner peripheral surface of the through hole in a radial direction of the through hole; and
   at least one holding projection that extends outward from the second axial end face of the connector; and
   a pipe that is received through the through hole of the connector, wherein:
   the pipe includes a protrusion, which extends along an outer peripheral surface of the pipe and which protrudes radially outward from the outer peripheral surface of the pipe;
   the protrusion of the pipe is received in the recess of the connector; and
   the at least one holding projection of the connector is bent and is thus urged against the outer peripheral surface of the pipe at a position spaced from the through hole to hold the pipe.

2. The pipe joint structure according to claim 1, wherein:
   the through hole of the connector has a radial opening, which opens radially outward to an exterior of the connector; and
   the radial opening of the through hole of the connector axially extends along an entire axial extent of the through hole and thus axially extends through the recess to enable insertion of the pipe into the through hole in the radial direction of the through hole.

3. The pipe joint structure according to claim 1, wherein:
   the protrusion of the pipe extends all around the pipe near an end of the pipe; and
   each of the at least one holding projection of the connector extends generally in an axial direction of the through hole and is bent inward in the radial direction of the through hole, so that each of the at least one holding projection is angled relative to the axial direction of the through hole.

4. The pipe joint structure according to claim 3, wherein the protrusion of the pipe is press fitted into the recess of the connector.

5. The pipe joint structure according to claim 3, wherein the at least one holding projection of the connector includes a plurality of holding projections, which are arranged one after another in a circumferential direction of the through hole.

6. The pipe joint structure according to claim 3, wherein:
   the recess of the connector has a non-circular cross section;
   an inner peripheral surface of the recess of the connector includes a radially close section and a radially remote section, wherein the radially close section is radially closer to an inner peripheral surface of the through hole of the connector in comparison to the radially remote section; and
   an outer diameter of the protrusion of the pipe is larger than a diameter of an imaginary inscribed circle, which inscribes the inner peripheral surface of the recess of the connector.

7. The pipe joint structure according to claim 1, wherein:
   the pipe is made of an aluminum alloy; and
   the connector is made of an aluminum alloy, which has a hardness greater than that of the aluminum alloy of the pipe.

8. The pipe joint structure according to claim 1, wherein the pipe is one of a plurality of pipes, which are held by the connector.

9. The pipe joint structure according to claim 1, wherein:
   the pipe joint structure is for a refrigeration cycle of an air conditioning system; and
   the pipe is a refrigerant pipe for conducting refrigerant.

* * * * *